US012041384B2

(12) United States Patent
Tak et al.

(10) Patent No.: US 12,041,384 B2
(45) Date of Patent: Jul. 16, 2024

(54) METHOD AND HOME APPLIANCE DEVICE FOR GENERATING TIME-LAPSE VIDEO

(71) Applicant: SAMSUNG ELECTRONICS CO., LTD., Suwon-si (KR)

(72) Inventors: Yoonsik Tak, Suwon-si (KR); Aeran Lim, Suwon-si (KR); Junho Rim, Suwon-si (KR); Jaewook Shin, Suwon-si (KR); Hyungdong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 22 days.

(21) Appl. No.: 18/093,133

(22) Filed: Jan. 4, 2023

(65) Prior Publication Data

US 2023/0216985 A1 Jul. 6, 2023

Related U.S. Application Data

(63) Continuation of application No. PCT/KR2022/020944, filed on Dec. 21, 2022.

(30) Foreign Application Priority Data

Dec. 28, 2021 (KR) .................. 10-2021-0190342
Feb. 9, 2022 (KR) .................. 10-2022-0016972

(51) Int. Cl.
*G06V 10/62* (2022.01)
*G06V 10/74* (2022.01)
(Continued)

(52) U.S. Cl.
CPC ............ *H04N 5/783* (2013.01); *G06V 10/62* (2022.01); *G06V 10/761* (2022.01); *H04N 5/2621* (2013.01); *G06V 2201/07* (2022.01)

(58) Field of Classification Search
CPC ........ G06V 10/62; G06V 10/74; H04N 5/262; H04N 5/783
(Continued)

(56) References Cited

U.S. PATENT DOCUMENTS 6,577,805 B1 * 6/2003 Hirai .................... G11B 27/036
386/326
9,413,940 B2 8/2016 Gwak
(Continued)

FOREIGN PATENT DOCUMENTS

CN 110488672 A 11/2019
CN 111083537 A 4/2020
(Continued)

OTHER PUBLICATIONS

Communication issued by the International Searching Authority on Mar. 21, 2023 in International Patent Application No. PCT/KR2022/020944 (PCT/ISA/220, PCT/ISA/210, and PCT/ISA/237).

*Primary Examiner* — Daquan Zhao
(74) *Attorney, Agent, or Firm* — Sughrue Mion, PLLC

(57) ABSTRACT

A method of generating a time-lapse video includes: identifying an image storage mode; obtaining a first image; based on identifying that the image storage mode is an emphasis mode for emphasizing one or more images, obtaining a first time difference between the first image and a stored image, and a first feature value indicating a first amount of change between the first image and the stored image; for each respective image of a first plurality of images of a first image group stored in a memory, identifying a second image from among the first plurality of images, based on a second time difference and a second feature value; generating a second image group by removing the second image from the first image group and adding the first image to the first image group; and generating the time-lapse (Continued)

video by using a second plurality of images of the second image group.

20 Claims, 25 Drawing Sheets

(51) Int. Cl.
  *H04N 5/262* (2006.01)
  *H04N 5/783* (2006.01)
(58) Field of Classification Search
  USPC ....... 386/343, 278, 279, 280, 282, 200, 239, 386/248
  See application file for complete search history.

(56) References Cited

U.S. PATENT DOCUMENTS

| | | | |
|---|---|---|---|
| 9,639,762 | B2 | 5/2017 | Chakraborty et al. |
| 10,313,549 | B2 | 6/2019 | Guo et al. |
| 10,755,105 | B2 | 8/2020 | Chakraborty et al. |
| 11,051,370 | B2 | 6/2021 | Imai et al. |
| 2009/0077137 | A1 | 3/2009 | Weda et al. |
| 2018/0077332 | A1* | 3/2018 | Shimura .............. H04N 25/589 |
| 2022/0051458 | A1* | 2/2022 | Yeon ....................... G06T 11/60 |

FOREIGN PATENT DOCUMENTS

| | | |
|---|---|---|
| CN | 113676706 A | 11/2021 |
| JP | 2008-178090 A | 7/2008 |
| JP | 2009-536490 A | 10/2009 |
| JP | 2010-28189 A | 2/2010 |
| JP | 2016-80268 A | 5/2016 |
| JP | 2017-526086 A | 9/2017 |
| JP | 2017-225037 A | 12/2017 |
| JP | 2021-169875 A | 10/2021 |
| KR | 10-2017-0074538 A | 6/2017 |
| KR | 10-1805626 B1 | 12/2017 |
| KR | 10-2020-0030955 A | 3/2020 |
| WO | WO2019/059209 A1 | 3/2019 |

* cited by examiner

FIG. 8

|  | TIME DIFFERENCE | FEATURE VALUE | TOTAL SCORE (a=0.4) |
|---|---|---|---|
| IMAGE 1 | 2 | 7 | 5 |
| IMAGE 2 | 4 | 9 | 5.2 |
| IMAGE 3 | 8 | 5 | 6.2 |
| IMAGE 4 | 6 | 6 | 6 |
| CAPTURED IMAGE | 4 | 6 | 5.2 |

METHOD AND HOME APPLIANCE DEVICE FOR GENERATING TIME-LAPSE VIDEO

CROSS-REFERENCE TO RELATED APPLICATIONS

This application is a continuation application of International Application No. PCT/KR2022/020944, filed on Dec. 21, 2022, which is based on and claims priority to Korean Patent Application No. 10-2021-0190342, filed on Dec. 28, 2021, and Korean Patent Application No. 10-2022-0016972, filed on Feb. 9, 2022, in the Korean Intellectual Property Office, the disclosures of which are incorporated by reference herein in their entireties.

BACKGROUND

1. Field

The disclosure relates to a home appliance device for generating a time-lapse video and a method of generating a time-lapse video based on stored images.

2. Description of Related Art

It has been increasingly attempted to provide various services to a user based on an image captured by adding a camera, and the like, to an oven. A service providing a video based on the captured images may have been developed, and a user using such a service may upload the provided video to a social network service (SNS), and the like.

A related art oven may just briefly provide a captured image, which may provide a simple summary of a cooking process. However, the related art oven may not be able to provide a user with a time-lapse video automatically edited to reflect the characteristics of a cooking video.

Alternatively or additionally, in a low-resource environment of a related oven (e.g., limited storage space, limited processing resources, limited connectivity) may be unable to store many images, and thus, a technique to generate a time-lapse video, using a limited storage space, may be required.

SUMMARY

Provided are a method and a home appliance device for generating a time-lapse video, whereby an obtained image may be stored by comparing the obtained image with one of stored images and determining one between the obtained image and the one of the stored images, and a time-lapse video may be generated based on the stored images.

According to an aspect of the disclosure, a method of generating a time-lapse video may be provided. The method may include identifying an image storage mode. The method may include obtaining a first image. The method may include based on identifying that the image storage mode is an emphasis mode for emphasizing one or more images, obtaining a first time difference between the first image and a stored image, and a first feature value indicating a first amount of change between the first image and the stored image. The method may include for each respective image of a first plurality of images of a first image group stored in a memory, identifying a second image from among the first plurality of images, based on a second time difference between the respective image and the second image and a second feature value indicating a second amount of change between the respective image and the stored image. The method may include based on the first time difference, the first feature value, the second time difference, and the second feature value, generating a second image group by removing the second image from the first image group and adding the first image to the first image group. The method may include generating the time-lapse video by using a second plurality of images of the second image group.

According to an aspect of the disclosure, a home appliance device for generating a time-lapse video may be provided. The home appliance device may include at least one memory storing at least one instruction; and at least one processor configured to execute the at least one instruction to. The at least one processor may be configured to execute the at least one instruction to identify an image storage mode. The at least one processor may be configured to execute the at least one instruction to obtain a first image. The at least one processor may be configured to execute the at least one instruction to, based on identifying that the image storage mode is an emphasis mode for emphasizing one or more images, obtain a first time difference between the first image and a stored image before the first image, and a first feature value indicating an amount of change between the first image and the stored image before the first image. The at least one processor may be configured to execute the at least one instruction to for each respective image of a first plurality of images of a first image group stored in the at least one memory, identify a second image from among the first plurality of images, based on a second time difference between the respective image and a stored image before the respective image and a second feature value indicating an amount of change between the respective image and the stored image before the respective image. The at least one processor may be configured to execute the at least one instruction to, based on the first time difference, the first feature value, the second time difference, and the second feature value, generate a second image group by removing the second image from the first image group and adding the first image to the first image group. The at least one processor may be configured to execute the at least one instruction to generate the time-lapse video by using a second plurality of images of the second image group.

BRIEF DESCRIPTION OF DRAWINGS

The above and other aspects, features, and advantages of certain embodiments of the present disclosure will be more apparent from the following description taken in conjunction with the accompanying drawings, in which:

FIG. 8 is a view for describing a time difference and a feature value of an image obtained from a home appliance device, according to an embodiment of the disclosure;

DETAILED DESCRIPTION

Figure 1:
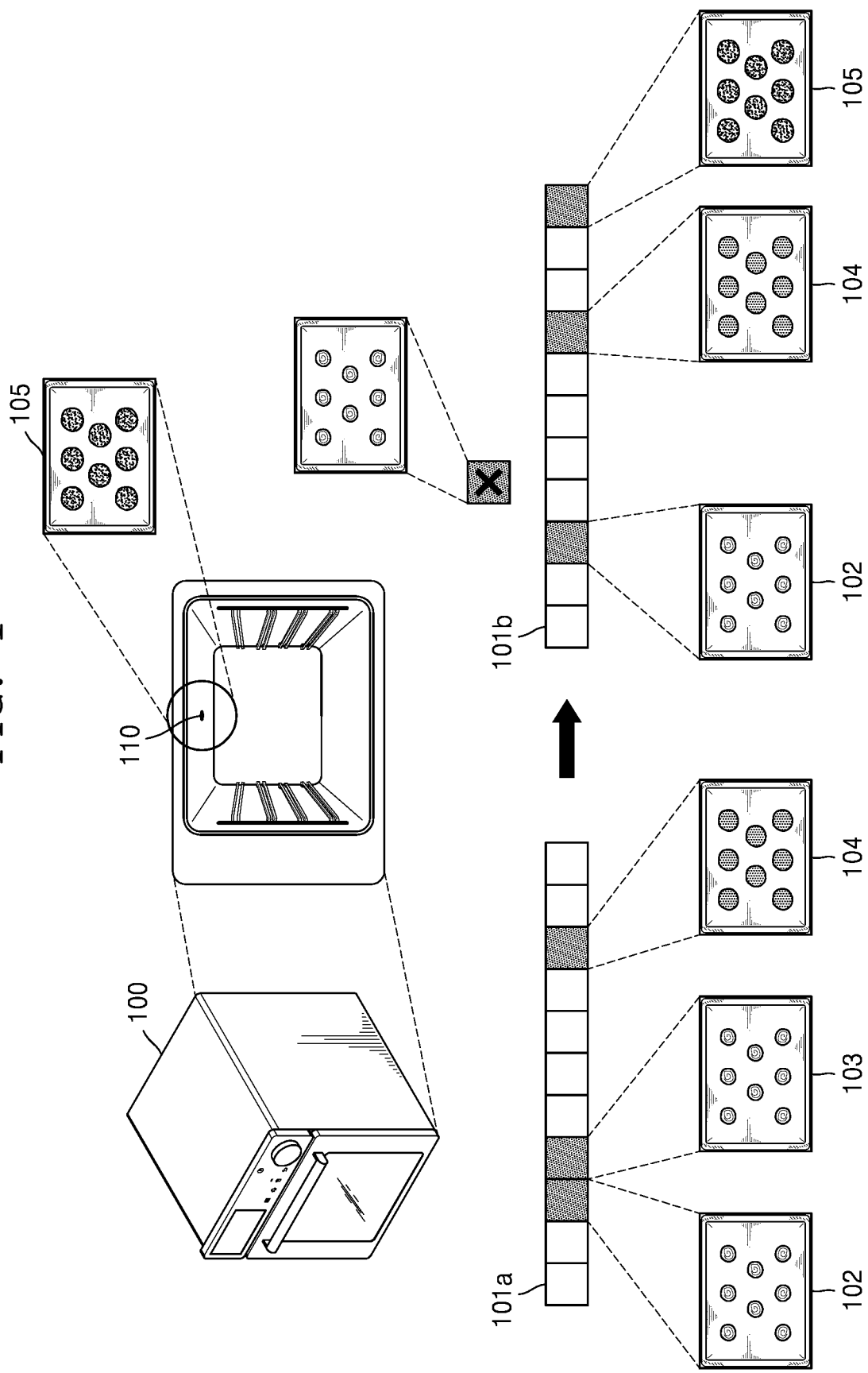
FIG. 1 is a view for describing an example of a home appliance device storing a first image obtained by using a camera, according to an embodiment of the disclosure.

Throughout the disclosure, the expression "at least one of a, b or c" indicates only a, only b, only c, both a and b, both a and c, both b and c, all of a, b, and c, or variations thereof.

The terms used herein are briefly described and then an embodiment of the disclosure is described in detail.

In the disclosure, general terms that have been widely used nowadays are selected, when possible, in consideration of functions of an embodiment of the disclosure, but non-general terms may be selected according to the intentions of technicians in the this art, precedents, or new technologies, etc. Also, some terms may be arbitrarily chosen by the present applicant. In this case, the meanings of these terms are explained in corresponding parts of an embodiment of the disclosure in detail. Thus, the terms used herein should be defined not based on the names thereof but based on the meanings thereof and the whole context of the disclosure.

Throughout the disclosure, it will be understood that when an element is referred to as "including" another element, the element may further include other elements unless mentioned otherwise. Also, the terms, such as "unit" or "module," used in the disclosure, should be understood as a unit that processes at least one function or operation and that may be embodied in a hardware manner, a software manner, or a combination of the hardware manner and the software manner.

Hereinafter, embodiments of the disclosure are described in detail with reference to the accompanying drawings, so that the embodiments of the disclosure may be easily implemented by one of ordinary skill in the art. However, an embodiment of the disclosure may have different forms and should not be construed as being limited to the embodiments described herein. Also, in the drawings, parts not related to descriptions are omitted for the clear description of an embodiment of the disclosure, and throughout the disclosure, like reference numerals are used for like elements.

FIG. 1 is a view for describing an example in which a home appliance device 100 stores a first image 105 obtained by using a camera 110, according to an embodiment of the disclosure.

The home appliance device 100, according to an embodiment of the disclosure, may include an inner space. For example, the home appliance device 100 may include a gas oven, an electric oven, a dishwasher, a small-sized refrigerator, etc., but is not limited thereto. When the home appliance device 100 is an oven, the inner space may indicate a cooking chamber, when the home appliance device 100 is a small-sized refrigerator, the inner space may indicate a storeroom, and when the home appliance device 100 is a dishwasher, the inner space may indicate a container. With respect to FIG. 1, an example in which the home appliance device 100 is an oven is described.

According to an embodiment of the disclosure, the home appliance device 100 may include the camera 110 in the inner space. The home appliance device 100 may obtain a captured image using the camera 110. The camera 110 may be configured to monitor the inner space of the home appliance device 100 and may capture an image of the inner space so that the home appliance device 100 may obtain the image. The camera 110 may capture a still image and/or may capture a video. The camera 110 may capture the inner space for each predetermined capturing period. While the home appliance device 100 performs a main function, a corresponding operation may be cyclically captured by the camera 110.

When the home appliance device 100 is an oven, the camera 110 may capture the inner space for each obtainment period, while the cooking is continued, so that the home appliance device 100 may obtain the image. The capturing by the camera 110 may be continually repeated until the operation of the oven is ended. When the home appliance device 100 is a dishwasher, the capturing may be cyclically performed while a washing function is performed.

According to an embodiment of the disclosure, the obtainment period of the home appliance device 100 may denote a capturing period of the camera 110. The obtainment period of the home appliance device 100 may be changed according to the number of times of obtainment. For example, when the home appliance device 100 is able to store 300 pieces of images, the first 300 pieces of images may be obtained at an interval of one second, the next 150 pieces of images may be obtained at an interval of two seconds, and the next 150 pieces of images may be obtained at an interval of four seconds. Like this, the obtainment period may be increased (e.g., by a factor of N, where N is a natural integer greater than 1, and/or by a set amount) for each predetermined number of times of obtainment. However, the obtainment period is not limited thereto. According to an embodiment of the disclosure, to determine, via the home appliance device 100, the obtainment period according to the number of times of obtainment may be realized by adjusting a capturing period according to the number of times of capturing by the camera 110. The camera 110 may be a wide-angle camera having a viewing angle to capture the inner space, but is not limited thereto. The camera 110 may be arranged at the center of a ceiling and may capture an image of the inner space, but is not limited thereto.

According to an embodiment of the disclosure, the home appliance device 100 may compare an obtained image 105 with a plurality of images 101*a* stored in the home appliance device 100 in real time and may store the obtained image 105 instead of one image 103 from among the plurality of stored images 101*a*. For example, one image 103 may be selected from among the plurality of images 101*a* stored in a memory of the home appliance device 110 and may be compared with the obtained image 105. The plurality of images 101*a* may include images 102, 103, and 104 obtained by the camera 110 by capturing the inner space.

The home appliance device 100 may calculate a time difference between the obtained image 105 and a previously stored image and a feature value indicating the amount of change between images. According to an embodiment of the disclosure, the time difference may be calculated from a difference between obtainment times of the two images, and the amount of change may be calculated by using a difference between pixel values of the two images. According to an embodiment of the disclosure, the amount of change between images may be calculated by using the saliency map or the optical flow or may be calculated through machine learning, etc. The disclosure is not limited in this respect. Alternatively or additionally, with respect to each image 102, 103, or 104 of the plurality of stored images 101*a*, the home appliance device 100 may calculate a time difference and a feature value between each image 102, 103, or 104 and a respective previously stored image of each image 102, 103, or 104, and based on the time difference and the feature value calculated with respect to each image 102, 103, or 104, may determine one image 103 that is to be compared with the obtained image 105. When the determined image 103 is similar to the previously obtained image 102, and thus, the amount of change thereof is little, and the obtained image 105 is greatly different from a previously obtained image, and thus, the amount of change thereof is great, the obtained image 105 may be stored instead of the determined image 103. However, the disclosure is not limited thereto. A method, performed by the home appliance device 100, of storing the obtained image 105 by comparing the obtained image 105 with the plurality of stored images 101*a* is described in more detail below with reference to FIGS. 5 through 10.

According to an embodiment of the disclosure, the home appliance device 100 may generate a time-lapse video by using a plurality of stored images 101*b*. The time-lapse video may denote a video that is generated by capturing images at a low speed and shows the captured images at a speed higher than the speed at which the images are captured. For example, the home appliance device 100 may generate a 20-frame per second (fps) time-lapse video of a length of 15 seconds, by using 300 images captured once a second for 5 minutes. The home appliance device 100 may obtain 600 images captured once a second for 10 minutes and may use 300 images thereof to generate a time-lapse video having a length of 15 seconds. An operation of selecting the 300 images from among the obtained 600 images may be performed in real time by determining whether or not to store an image whenever the image is obtained. The home appliance device 100 may generate the time-lapse video by sorting a plurality of stored images in an order of obtainment times.

According to an embodiment of the disclosure, the home appliance device 100 may generate a highlight image group by using the obtained image 105. For example, regarding a time difference between the obtained image 105 and a previous image and the amount of change between the obtained image 105 and the previous image, when the time difference and the amount of change are greater than or equal to threshold values, the home appliance device 100 may add the obtained image 105 to the highlight image group. The highlight image group may be a group of images that have large amounts of change with respect to previously obtained images. When the home appliance device 100 generates the time-lapse video by using the highlight image group, the time-lapse video including the images having the large amounts of change may be generated. A method, performed by the home appliance device 100, of determining the highlight image group is described in more detail below with reference to FIG. 11.

According to an embodiment of the disclosure, the home appliance device 100 may add a special effect when generating the time-lapse image. For example, the home appliance device 100 may use, in some sections, a zoom-in effect for zooming in an image, a pan effect for giving an effect of capturing an image via the movement of a camera, through changing an enlarged image area, and a boomerang effect for repeating reproduction and reverse reproduction of an image. However, the home appliance device 100 is not limited thereto. The home appliance device 100 may use a special effect for the entire section of the time-lapse video. A user may select a special effect to be used for the generation of the time-lapse video. The special effect applied by the home appliance device 100 when generating the time-lapse video is described in more detail below with reference to FIGS. 14 through 15D.

According to an embodiment of the disclosure, the home appliance device 100 may generate the time-lapse video by using the stored images, in response to a user input with respect to generation of a video. For example, when the home appliance device 100 is an oven, the home appliance device 100 may receive a request to generate a time-lapse video from a user, while the home appliance device 100 executes a cooking function. In response to the request to generate a time-lapse video from the user, the home appliance device 100 may generate a time-lapse video by using a plurality of stored images. Even while there is a request to generate a time-lapse video, the home appliance device 100 may maintain an operation of obtaining an image generated by capturing an inner space. A method, performed by the home appliance device 100, of generating a time-lapse video in response to a request to generate a time-lapse video from a user is described in more detail below with reference to FIG. 16.

According to an embodiment of the disclosure, the home appliance device 100 may determine an image storing condition by identifying an object included in an image obtained through the camera 110. For example, when the object included in the image obtained by using the camera 110 is recognized to be beef, and an expected dish is identified to be a steak, the home appliance device 100 may expect a cooking time of 60 minutes and set an obtainment period to be 5 seconds. However, the disclosure is not limited thereto.

Hereinafter, components of the home appliance device 100 for generating a time-lapse video are described in more detail with reference to FIGS. 2 and 3.

Figure 2:
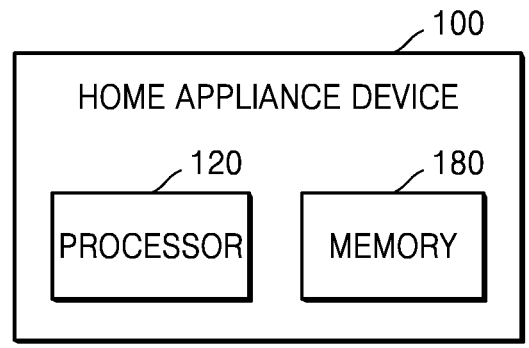
FIG. 2 is a block diagram for describing a function of a home appliance device, according to an embodiment of the disclosure.

FIG. 2 is a block diagram for describing a function of the home appliance device 100, according to an embodiment of the disclosure.

As illustrated in FIG. 2, the home appliance device 100, according to an embodiment of the disclosure, may include a processor 120 and a memory 180.

Hereinafter, the components are sequentially described.

The processor 120 may control operation of the home appliance device 100. The processor 120 may control the camera 110, a driver portion 130, a sensor portion 140, a communication interface 150, a user interface 160, a lamp 170, and the memory 180 by executing programs stored in the memory 180.

According to an embodiment of the disclosure, the home appliance device 100 may comprise an artificial intelligence (AI) processor. The AI processor may be comprised by the home appliance device 100 in the form of an AI-dedicated hardware chip or in the form of a portion of a previous general-purpose processor (e.g., a central processing unit (CPU) or an application processor) or a graphics dedicated processor (e.g., a graphics processing unit (GPU)).

According to an embodiment of the disclosure, the processor 120 may identify an image storage mode and may obtain, through the communication interface 150, a first image generated by capturing an inner space of the home appliance device 100. According to an embodiment of the disclosure, the camera 110 may capture the first image including the inner space of the home appliance device 100. Based on the image storage mode, which is an emphasis mode for emphasizing one or more images, the processor 120 may calculate a time difference of the first image indicating a time difference between the first image and a previously stored image, and a feature value of the first image indicating the amount of change between the first image and the previously stored image.

With respect to each of a plurality of images of a first image group stored in the memory 180, based on a time difference of each of the plurality of images indicating a time difference between each image and a previously stored image and a feature value of each image indicating the amount of change between each image and the previously stored image, the processor 120 may determine one of the plurality of images as a second image.

Based on the time difference and the feature value of the first image and the time difference and the feature value of the second image, the processor 120 may delete the second image from the first image group and add the first image to the first image group in order to generate a second image group and may generate a time-lapse video by using a plurality of images of the second image group. The operation of generating the time-lapse video via the home appliance device 100 is described in more detail below with reference to FIG. 4.

The memory 180 may store a program for processing and controlling by the processor 120 and may store input/output data (e.g., recipe information, an area table, a distance table, crop area size information, a distortion correction value, a brightness level table, etc.). The memory 180 may store an AI model. For example, the memory 180 may store an AI model for object recognition, an AI model for recipe recommendation, etc.

The memory 180 may include a storage medium of at least one of a flash memory-type, a hard disk-type, a multimedia card micro-type, a card-type memory (e.g., Secure Digital (SD) or eXtreme Digital(XD) memory), random-access memory (RAM), static RAM (SRAM), read-only memory (ROM), electrically erasable programmable ROM (EEPROM), programmable ROM (PROM), a magnetic memory, a magnetic disk, or an optical disk. Alternatively or additionally, the home appliance device 100 may be synchronized with a web storage or a cloud server performing a storage function on the Internet.

Figure 3:
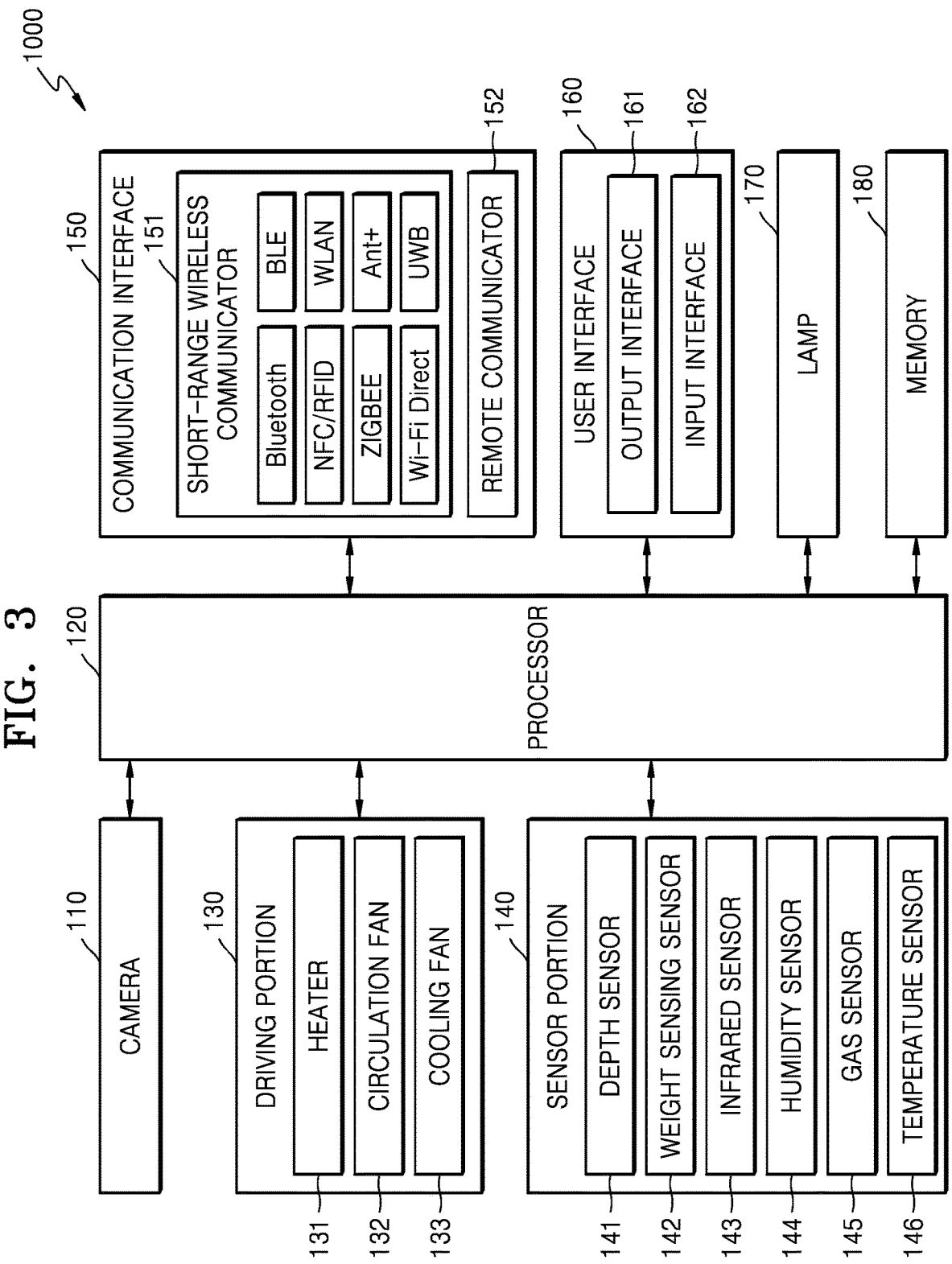
FIG. 3 is a block diagram for describing a function of a home appliance device, according to an embodiment of the disclosure.

As illustrated in FIG. 3, the home appliance device 100, according to an embodiment of the disclosure, may also include the camera 110, the driver portion 130, the sensor portion 140, the communication interface 150, the user interface 160, and the lamp 170, in addition to the processor 120 and the memory 180.

The camera 110 may denote a device for obtaining at least one frame with respect to an object. Here, the at least one frame may be represented by an image (e.g., a still image and/or a video) or a picture.

The camera 110 may be mounted in the inner space of the home appliance device 100. For example, the camera 110 may be mounted in the middle of a ceiling, at a side of the ceiling, or on an inner wall surface of the home appliance device 100, but is not limited thereto. The camera 110 may be a wide-angle camera having a viewing angle to capture the inner space of the home appliance device 100. The camera 110 may be an ultra-small camera or a pin-hole camera. The camera 110 may have the durability to endure high heat and electromagnetic waves and may have a waterproof function. Alternatively or additionally, a coil heating wire may be wound around the camera 110 to prevent frost generation. According to an embodiment of the disclosure, a plurality of cameras 110 may be mounted in the inner space of the home appliance device 100.

The driver portion 130 may include a heater 131, a circulation fan 132, and a cooling fan 133, but is not limited thereto. The driver portion 130 may be changed depending on a type of the home appliance device 100. For example, when the home appliance device 100 is a small-sized refrigerator, the driver portion 130 may further include a compressor and an air cleaner. When the home appliance device 100 is a dishwasher, the driver portion 130 may further include a motor, a spray portion, a dryer, and a condenser.

When the home appliance device 100 is an oven, the heater 131 configured to heat food may be provided in the inner space (e.g., a cooking chamber) of the home appliance device 100. The heater 131 may be an electric heater including an electric resistor or a gas heater generating heat by combusting gas.

The circulation fan 132 configured to circulate internal air so that food is evenly heated and a circulation motor configured to drive the circulation fan 132 may be provided at a back portion of the inner space (the cooking chamber). Alternatively or additionally, a fan cover covering the circulation fan 132 may be provided at a front portion of the circulation fan 132, and a cavity through which air may flow may be formed in the fan cover.

The cooling fan 133 may be a radial flow fan configured to inhale air from above and discharge the air in a radial direction. The cooling fan 133 may be arranged on a cooling channel. The cooling fan 133 may include a rotation plate formed to be flat, a hub formed in the center of the rotation plate and coupled to a rotation shaft of the cooling motor, and a plurality of wings formed from the center of the rotation plate toward a boundary portion of the rotation plate. The hub may be formed to have a cone shape having a downwardly increased radius, and thus, may diffuse the air inhaled from above in the radial direction.

The sensor portion 140 may include a depth sensor 141, a weight sensing sensor 142, an infrared sensor 143, a humidity sensor 144 configured to sense humidity of the inner space, a gas sensor 145 configured to sense a level of gas in the inner space, and a temperature sensor 146, but is not limited thereto. A function of each of the sensors may be intuitively inferred by one of ordinary skill in the art from its name, and thus, its detailed description is not given.

The communication interface 150 may include one or more components configured to enable communication between the home appliance device 100 and a server device (not shown) or between the home appliance device 100 and a mobile terminal (not shown). For example, the communication interface 150 may include a short-range wireless communicator 151, a remote communicator 152, etc.

The short-range wireless communicator 151 may include a Bluetooth communicator, a Bluetooth Low Energy (BLE) communicator, a near-field communicator (NFC), a WLAN (Wi-Fi) communicator, a Zigbee communicator, an infrared data association (IrDA) communicator, a Wireless-Fidelity (Wi-Fi) direct (WFD) communicator, a ultra-wideband (UWB) communicator, an Ant+ communicator, etc., but is not limited thereto. When the home appliance device 100 is remotely controlled by a server device (not shown) in an Internet of Things (IoT) environment, the remote communicator 152 may be used for communication with the server device. The remote communicator 152 may include the Internet, a computer network (e.g., a local area network (LAN) or a wide area network (WAN), and a mobile communicator). The mobile communicator may include a 3rd generation (3G) module, a 4th generation (4G) module, a 5th generation (5G) module, a long term evolution (LTE) module, an NB-IoT module, an LTE-M module, etc., but is not limited thereto.

The user interface 160 may include an output interface 161 and an input interface 162. The input interface 161 may be configured to output an audio signal or a video signal and may include a display and a sound outputter (e.g., a speaker, a buzzer).

When the display and a touch pad are layered to form a touch screen, the display may be used not only as the output interface 161, but also as the input interface 161. The display may include at least one of a liquid crystal display, a thin-film transistor-liquid crystal display, a light-emitting diode (LED), an organic LED, a flexible display, a three-dimensional (3D) display, or an electrophoretic display. Alternatively or additionally, according to a form in which the home appliance device 100 is realized, the home appliance device 100 may include at least two displays.

The sound outputter may output audio data received from the communication interface 150 or stored in the memory 180. Alternatively or additionally, the sound outputter may output a sound signal related to a function performed by the home appliance device 100. The sound outputter may include a speaker, a buzzer, etc.

According to an embodiment of the disclosure, the display may output a monitoring image of the inner space of the home appliance device 100 and/or output recipe information with respect to a food material. Alternatively or additionally, the display may output a correction value of a cooking temperature determined according to a height at which a tray is inserted.

The input interface 162 may be configured to receive an input from a user. The input interface 162 may include at least one of a key pad, a dome switch, a touch pad (e.g., a touch capacitance method, a pressure resistive-layer method, an infrared sensing method, a surface ultrasonic conduction method, an integral tension measurement method, a piezo effect method, etc.), a jog wheel, or a jog switch, but is not limited thereto.

The input interface 162 may include a sound recognition module. For example, the home appliance device 100 may receive a sound signal, which is an analog signal, through a microphone and may convert a sound portion into computer-readable text by using an automatic speech recognition (ASR) model. The home appliance device 100 may interpret the converted text by using a natural language understanding (NLU) model and may obtain an intention of an utterance of a user. Here, the ASR model or the NLU model may be an AI model. The AI model may be processed by an AI-dedicated processor designed to have a hardware structure specialized for processing an AI model. The AI model may be formed through training. Here, to be formed through training denotes that a basic AI model is trained by using a plurality of pieces of training data through a training algorithm, so that a predefined operation rule or an AI model configured to perform a desired feature (or an objective) is formed. The AI model may include a plurality of neural network layers. The plurality of neural network layers may respectively have a plurality of weight values and may perform calculation using a calculation result of a previous layer and the plurality of weight values.

Language understanding is a technique to recognize and apply/process human languages/letter and may include natural language processing, machine translation, dialog system, question answering, speech/recognition/synthesis, etc.

The lamp 170 may be arranged on a surface of the inner space of the home appliance device 100 and may be expressed as an internal lamp. For example, the lamp 170 may be arranged on the ceiling or a side surface, but is not limited thereto. The lamp 170 may be turned on before a door of the home appliance device 100 is opened or when the home appliance device 100 operates. The lamp 170 may be protected by a glass cover.

According to an embodiment of the disclosure, the lamp 170 may have various brightness levels. For example, the lamp 170 may emit light having a brightness from a low level to a high level. The brightness of the lamp 170 may be adjusted by the processor 120. The lamp 170 may be a halogen lamp or an LED lamp, but is not limited thereto.

Hereinafter, a method, performed by the home appliance device 100, of generating a time-lapse video by obtaining an image is described in detail with reference to FIG. 4.

Figure 4:
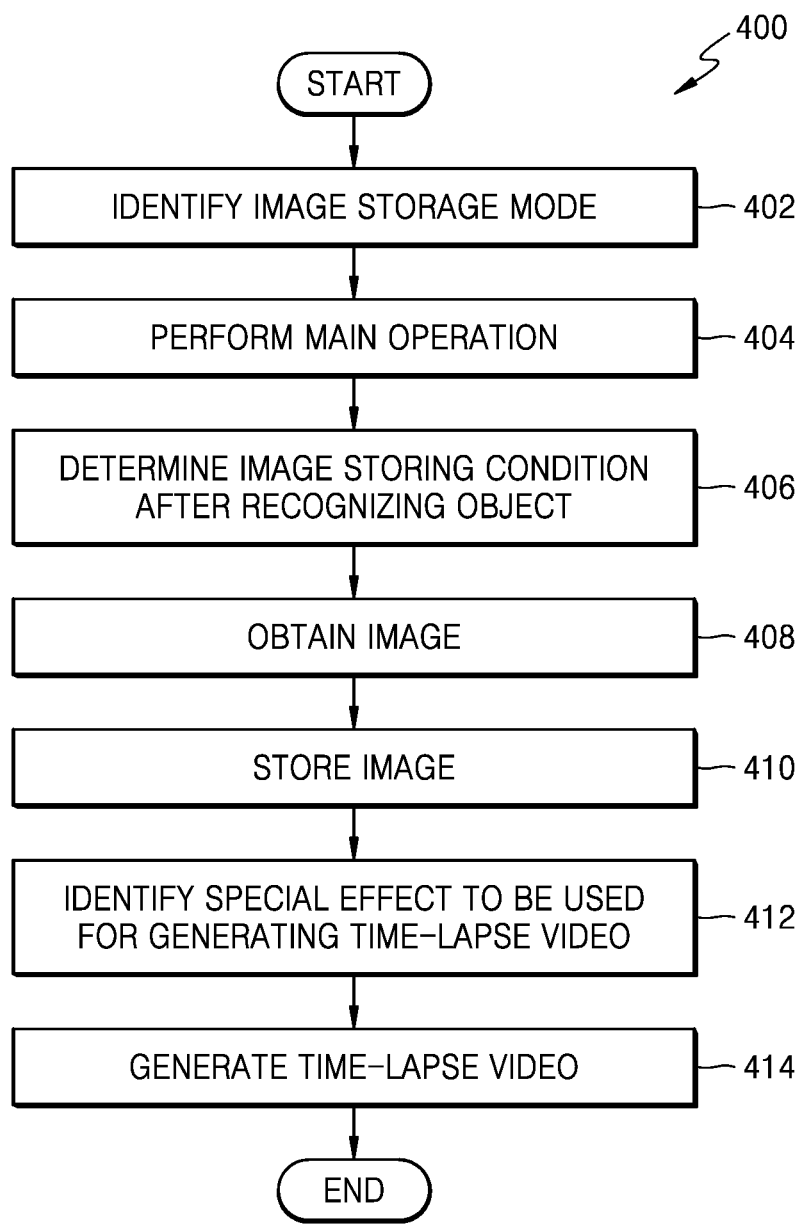
FIG. 4 is a flowchart for describing a method, performed by a home appliance device, of generating a time-lapse video, according to an embodiment of the disclosure.

FIG. 4 is a flowchart for describing the method, performed by the home appliance device 100, of generating a time-lapse video, according to an embodiment of the disclosure.

In operation 402, the home appliance device 100, according to an embodiment of the disclosure, may identify an image storage mode. According to an embodiment of the disclosure, the image storage mode be a configuration related to a method of storing an obtained image. For example, the image storage mode may be an emphasis mode for storing an image such that one or more images of the obtained images are emphasized, an equality mode for storing images such that intervals of obtaining the images are constant, or a highlight mode for storing an image such that one or more images are relatively more emphasized. The home appliance device 100 may display a plurality of image storage modes on the display and may receive, from a user, an input of selecting one of the plurality of image storage modes in order to identify the image storage mode.

In operation 404, the home appliance device 100, according to an embodiment of the disclosure, may perform a main operation. The main operation may denote a function according to a main purpose of the home appliance device 100. When the home appliance device 100 is an oven, the main operation may be a cooking function. When the home appliance device 100 is a dishwasher, the main operation may be a cleaning function. The home appliance device 100 may receive an input of a time to perform the main operation, but it is not limited thereto. According to an embodiment of the disclosure, when the home appliance device 100 obtains a time preconfigured to perform the main operation, the home appliance device 100 may determine an image obtainment period based on the configured time. When a time to perform the main operation increases, the obtainment period may be increased, to prevent an excessive use of the memory and the processor.

In operation 406, the home appliance device 100, according to an embodiment of the disclosure, may recognize an object and then determine an image storing condition. For example, the home appliance device 100 may identify an object in the inner space through the camera 110 and may set the obtainment period. When the home appliance device 100 is an oven, and the identified object is a steak, the home appliance device 100 may determine the obtainment period to be 5 seconds, based on an expected cooking time of 1 hour. According to an embodiment of the disclosure, the obtainment period determined in operation 406 may be selected preferentially to an obtainment period determined based on the time of the main operation received from the user in operation 404. According to an embodiment of the disclosure, the operation, performed by the home appliance device 100, of recognizing the object through the camera 110 may be performed without storing an image.

In operation 408, the home appliance device 100, according to an embodiment of the disclosure, may obtain an image. According to an embodiment, the home appliance device 100 may obtain the image from a capturing device or may capture the image through the camera. The home appliance device 100 may obtain the image for each obtainment period determined in operation 404 or 406 or for each predetermined obtainment period.

In operation 410, the home appliance device 100, according to an embodiment of the disclosure, may store the image. According to an embodiment of the disclosure, when the number of obtainment times is equal to or less than a predetermined value, the home appliance device 100 may store the image in the memory 180 without comparing the image with stored images. For example, when the home appliance device 100 is capable of storing 300 images, the home appliance device 100 may store the image without comparing the image with the stored images, when the number of obtainment times is less than 300.

According to an embodiment of the disclosure, the home appliance device 100 may delete one of a plurality of stored images and may store the obtained image. According to an embodiment of the disclosure, the home appliance device 100 may calculate a time difference and the amount of change between each of the plurality of stored images and a respective previously obtained image of each stored image and may determine one image that is most similar to the stored images by taking into account the time difference and the amount of change. The home appliance device 100 may compare the time difference and the amount of change of the determined image with a time difference and the amount of change of the obtained image, and when the time difference and the amount of change of the obtained image is greater than the time difference and the amount of change of the determined image, the home appliance device 100 may delete the determined image and store the obtained image.

According to an embodiment of the disclosure, the home appliance device 100 may equally store images. For example, when the home appliance device 100 is capable of storing 300 images, the home appliance device 100 may store the images by increasing an obtainment period (e.g., by a factor of N, where N is a natural integer greater than 1, and/or by a set amount) whenever 150 images are obtained after the number of obtainment times reaches 300.

According to an embodiment of the disclosure, the home appliance device 100 may determine a highlight image group. For example, independently from storing the obtained image by using the method described above, the home appliance device 100 may add the obtained image to a second highlight group image, when a time difference and the amount of change of the obtained image is greater than or equal to a predetermined value. When the time difference and the amount of change of the obtained image becomes less than or equal to the predetermined value, the home appliance device 100 may compare an average value of time differences and the amounts of change of images included in the second highlight image group with an average value of time differences and the amounts of change of images included in a first highlight image group. As a result of the comparison, when the time differences and the amounts of change of the images included in the second highlight image group are greater than the time differences and the amounts of change of the images included in the first highlight image group, the home appliance device 100 may delete the images included in the first highlight image group and add the images included in the second highlight image group to the first highlight image group. According to an embodiment of the disclosure, although the time differences and the amounts of change of the images included in the image groups are compared with each other by using the average values, the disclosure is not limited thereto, and the comparison may be performed by using median values, weighted averages, etc.

According to an embodiment of the disclosure, a time-lapse video may be generated by including the images of the first highlight image group. According to an embodiment of the disclosure, the method, performed by the home appliance device 100, of storing the obtained image may be realized as an overwrite method, in addition to the method of deleting the stored image and storing the obtained image.

In operation 412, the home appliance device 100, according to an embodiment of the disclosure, may identify a special effect used when generating a time-lapse video. According to an embodiment of the disclosure, the home appliance device 100 may display a plurality of types of special effects and may obtain, from a user, an input of selecting a special effect. According to another embodiment of the disclosure, the home appliance device 100 may determine a special effect by recognizing an object included in an image. For example, when the recognized object is bread, the home appliance device 100 may determine the special effect to be a zoom-in effect, and when the recognized object is a steak, the home appliance device 100 may determine the special effect to be a pan effect.

In operation 414, the home appliance device 100, according to an embodiment of the disclosure, may generate the time-lapse video. According to an embodiment of the disclosure, the home appliance device 100 may generate the time-lapse video by sorting stored images in a time order. For example, the home appliance device 100 may sort the images in the time order and may set an image replacement period in the time-lapse video to be 0.05 seconds. According to an embodiment of the disclosure, the home appliance device 100 may generate the time-lapse video by applying the special effect determined in operation 412. According to an embodiment of the disclosure, the time-lapse video may be generated by applying the special effect to only the images included in the highlight image group.

Figure 5:
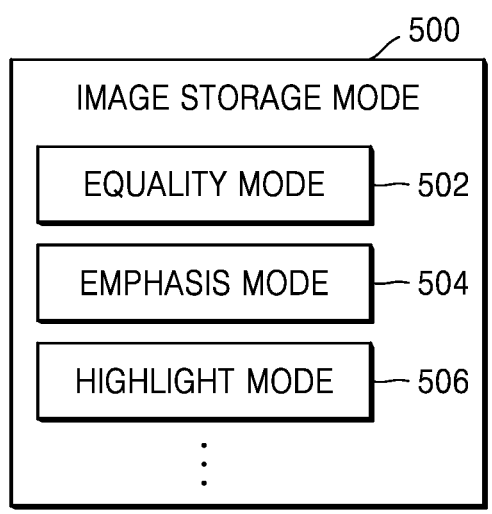
FIG. 5 is a view for describing an image storage mode of a home appliance device, according to an embodiment of the disclosure.

Some operations of the disclosure may be omitted. For example, when the home appliance device 100 does not recognize an object to omit operation 406, operation 408 may be performed directly after operation 404. Alternatively or additionally, some operations of the disclosure may be performed with orders thereof being changed. For example, the home appliance device 100 may perform the operation of selecting the special effect before the operation of obtaining the image, that is, operation 408. Referring to FIG. 5, an image storage mode is described in detail.

FIG. 5 is a view for describing an image storage mode 500 of the home appliance device 100, according to an embodiment of the disclosure.

Referring to FIG. 5, the image storage mode 500 may include an equality mode 502, an emphasis mode 504, or a highlight mode 506. The image storage mode 500 may be related to a method of storing images cyclically obtained by the home appliance device 100. The home appliance device 100 may include a limited memory, and when the home appliance device 100 lacks a memory storage space, the home appliance device 100 may delete a previously stored image and store an obtained image.

The equality mode 502 may be a method of storing an image such that an obtainment interval of stored images is substantially constant. For example, when times at which four images stored in the home appliance device 100 are obtained are respectively 10 seconds, 11 seconds, 13 seconds, and 15 seconds from a starting time of a main operation, and a time at which an image is obtained is 17 seconds from the starting time of the main operation, the image obtained at 10 seconds may be deleted, and the obtained image may be stored. Accordingly, the home appliance device 100 may store the image such that an obtainment time interval of the stored images may be the same to be 2 seconds. The equality mode 502 is described in more detail below with reference to FIGS. 9, 10A, and 10B.

The emphasis mode 504 may be a method, performed by the home appliance device 100, of storing an image based on the amount of change between an obtained image and a previously stored image. For example, when the home appliance device 100 is an oven, the home appliance device 100 may compare an image obtained while steak is cooked inside the home appliance device 100 with a previous image and may determine that the amount of change is great when a color of the flesh is changed or a size of the flesh is decreased. The method, performed by the home appliance device 100, of storing an image by using the emphasis mode 504 is described in more detail below with reference to FIGS. 6 through 8.

The highlight mode 506 may be a method of additionally storing images in a section in which a change of image is great, while the home appliance device 100 stores the images by using the equality mode 502 or the emphasis mode 504. That is, the highlight mode 506 may be an image storing method including a method of storing images obtained during an entire execution time of a main operation and a method of storing images obtained during a predetermined time section of the entire execution time of the main operation. The method, performed by the home appliance device 100, of storing an image by using the highlight mode 506 is described in more detail below with reference to FIG. 11.

Figure 6:
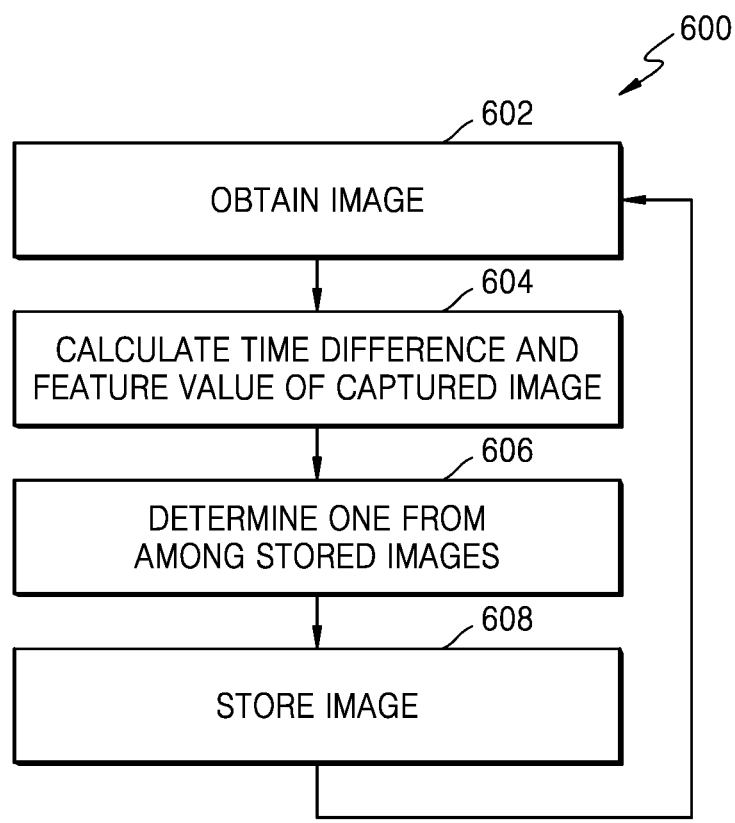
FIG. 6 is a flowchart for describing a method of storing an image when an image storage mode of a home appliance device is an emphasis mode, according to an embodiment of the disclosure.

FIG. 6 is a flowchart for describing an image storing method 600 when an image storage mode of the home appliance device 100 is an emphasis mode, according to an embodiment of the disclosure.

In operation 602, the home appliance device 100 may obtain an image. Operation 602 may denote operation 408 for obtaining an image in FIG. 4, according to an embodiment of the disclosure. The home appliance device 100 may cyclically capture an image through a camera to obtain an image or may obtain an image from an external electronic device.

In operation 604, the home appliance device 100 may calculate a time difference and a feature value of the obtained image. The time difference of the obtained image may be calculated by calculating a difference of an obtainment time between the obtained image and an image that is most recently stored (that is, stored last) from among stored images of the home appliance device 100. For example, when the most recently stored image is an image obtained at 15 seconds, and the image obtained in operation 602 is obtained at 17 seconds, the time difference may be calculated as 2 seconds. The feature value of the obtained image may be calculated by calculating a pixel value difference between the obtained image and the mostly recently stored image. For example, the feature value may be obtained by using a difference between a pixel value of the obtained image on an RGB color spectrum and a pixel value of the most recently stored image on the RGB color spectrum. The time difference and the feature value of the obtained image are described in more detail with reference to FIG. 7.

In operation 606, the home appliance device 100 may determine one image from among the stored images. The home appliance device 100 may calculate a time difference and a feature value of each of the stored images. The time difference of each of the stored images may be calculated by calculating a difference of an obtainment time between each image and an image stored directly previously to the image. For example, when the obtainment times of 4 of the stored images are respectively 2 seconds, 3 seconds, 5 seconds, and 6 seconds, based on a starting time of a main operation of the home appliance device 100, the time difference of the image obtained at 3 seconds may be calculated as 1 second, with respect to the obtainment time of the image stored directly previously to the image, which is 2 seconds. In the same manner, the time difference of the image obtained at 5 seconds may be 2 seconds, and the time difference of the image obtained at 6 seconds may be 1 second. The time difference of the image obtained at 2 seconds, which is first obtained from among the stored images, may be 2 seconds, but is not limited thereto.

The feature value of each stored image may be calculated by calculating a difference of a pixel value between each image and an image stored directly previously to the image. For example, the feature value may be obtained by using a difference between a pixel value of each image on the RGB color spectrum and a pixel value of the image stored directly previously to the image on the RGB color spectrum.

The home appliance device 100 may determine one image based on the time difference and the feature value of each stored image. According to an embodiment of the disclosure, the home appliance device 100 may calculate a total score by linearly combining the time difference and the feature value of each image, and may determine the image as an image having a lowest total score. The method, performed by the home appliance device 100, of determining one image from among the stored images is described in more detail with reference to FIG. 8.

In operation 608, the home appliance device 100 may store the obtained image. According to an embodiment of the disclosure, by comparing the time difference and the feature value of the obtained image with the time difference and the feature of the image determined in operation 606, the home appliance device 100 may determine to delete the determined image and store the obtained image or may determine not to delete the determined image and maintain the determined image. When a time difference and a feature value of an image have great values, the home appliance device 100 may determine the image as an important image for generating a time-lapse video. The home appliance device 100 may store the image and may obtain an image again (operation 602). While the home appliance device 100 performs a main operation, the home appliance device 100 may repeatedly perform operations 602 through 608.

Figure 7:
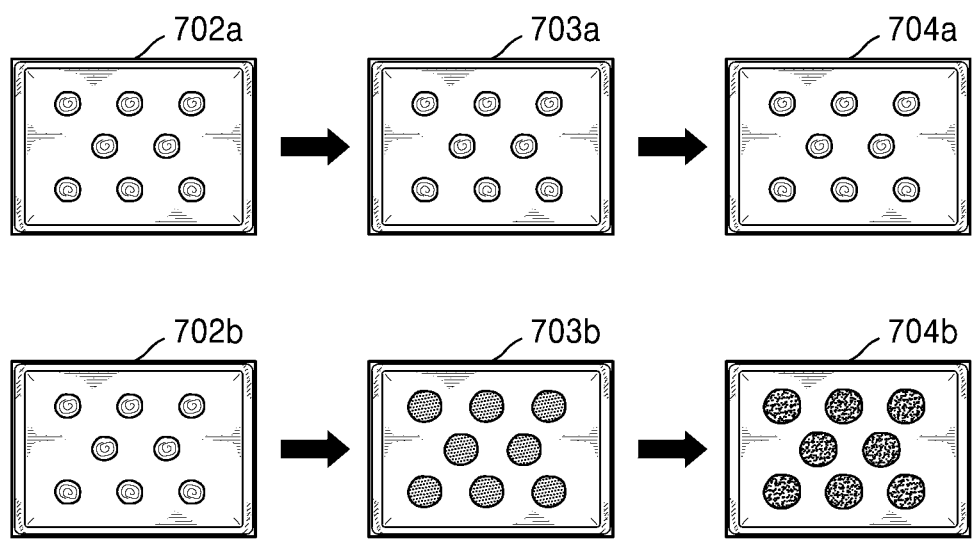
FIG. 7 is a view for describing a method, performed by a home appliance device, of calculating a feature value of an image, according to an embodiment of the disclosure.

FIG. 7 is a view for describing a method, performed by the home appliance device 100, of calculating a feature value of an image, according to an embodiment of the disclosure.

According to an embodiment of the disclosure, the home appliance device 100 may be an oven, a main operation may be a baking operation, and an internal dish may be bread. FIG. 7 is described based on an example in which bread is baked in an oven.

According to an embodiment of the disclosure, the home appliance device 100 may store a plurality of first images 702a, 703a, and 704a or a plurality of second images 702b, 703b, and 704b. For example, the plurality of first images 702a, 703a, and 704a may be images that are similar to each other showing few changes of the bread. The plurality of second images 702b, 703b, and 704b may be images showing a large difference therebetween by being obtained while the color of the bread becomes thicker and the volume of the bread is increased as the baking is continued.

According to an embodiment of the disclosure, the home appliance device 100 may calculate a feature value of each image by calculating a difference between a pixel value of each image and a pixel value of an image stored directly previously to the image. For example, a feature value of one image 703a from among the plurality of first images 702a, 703a, and 704 may be calculated by calculating a difference between a pixel value of the image 703a on an RGB color spectrum and a pixel value of the image 702a stored previously to the image 703a on the RGB color spectrum.

The plurality of first images 702a, 703a, and 704a may have similar colors and volumes, and thus, the difference between the pixel values of the plurality of first images 702, 703a, and 704a may be little. Thus, the feature value of each of the plurality of first images 702a, 703a, and 704a may be little.

On the contrary, the plurality of second images 702b, 703b, and 704b may have different colors and volumes from each other, and thus, the difference between the pixel values of the plurality of second images 702b, 703b, and 704b may be great. Thus, the feature value of each of the plurality of second images 702b, 703b, and 704b may be great.

FIG. 8 is a view for describing a time difference and a feature value of an image obtained from the home appliance device 100, according to an embodiment of the disclosure.

Referring to FIG. 8, the home appliance device 100 may store image 1, image 2, image 3, and image 4 and may obtain one image. The home appliance device 100 may calculate a time difference and a feature value of each image.

The home appliance device 100 may calculate a total score of each image based on the time difference and the feature value of each image. For example, the home appliance device 100 may calculate the total score by using Equation 1 below.

$$A\ total\ score = a \times time\ difference + (1-a) \times feature\ value \qquad [\text{Eq. 1}]$$

Here, a may be a predetermined constant. For example, a=0.4. However, the disclosure is not limited thereto. When the home appliance device 100 stores an image, the home appliance device 100 may store an increased number of images having a great time difference, as a increases, and may store an increased number of images having a great feature value, as a decreases.

According to an embodiment of the disclosure, the home appliance device 100 may store the obtained image by deleting an image having a low total score and storing an image having a high total score. For example, when a total score of the obtained image is 5.2, which is greater than 5, a total score of image 1, the home appliance device 100 may delete image 1 and store the obtained image. When total scores of all of the stored image are greater than the total score of the obtained image, the home appliance device 100 may not store the obtained image. By taking into account both of the time difference and the feature value, the home appliance device 100 may store images having great changes from previous images for the entire time domain. This configuration may enable formation of a video for the entire time period and more detailed provision of sections having great changes with respect to generation of a time-lapse video.

Figure 9:
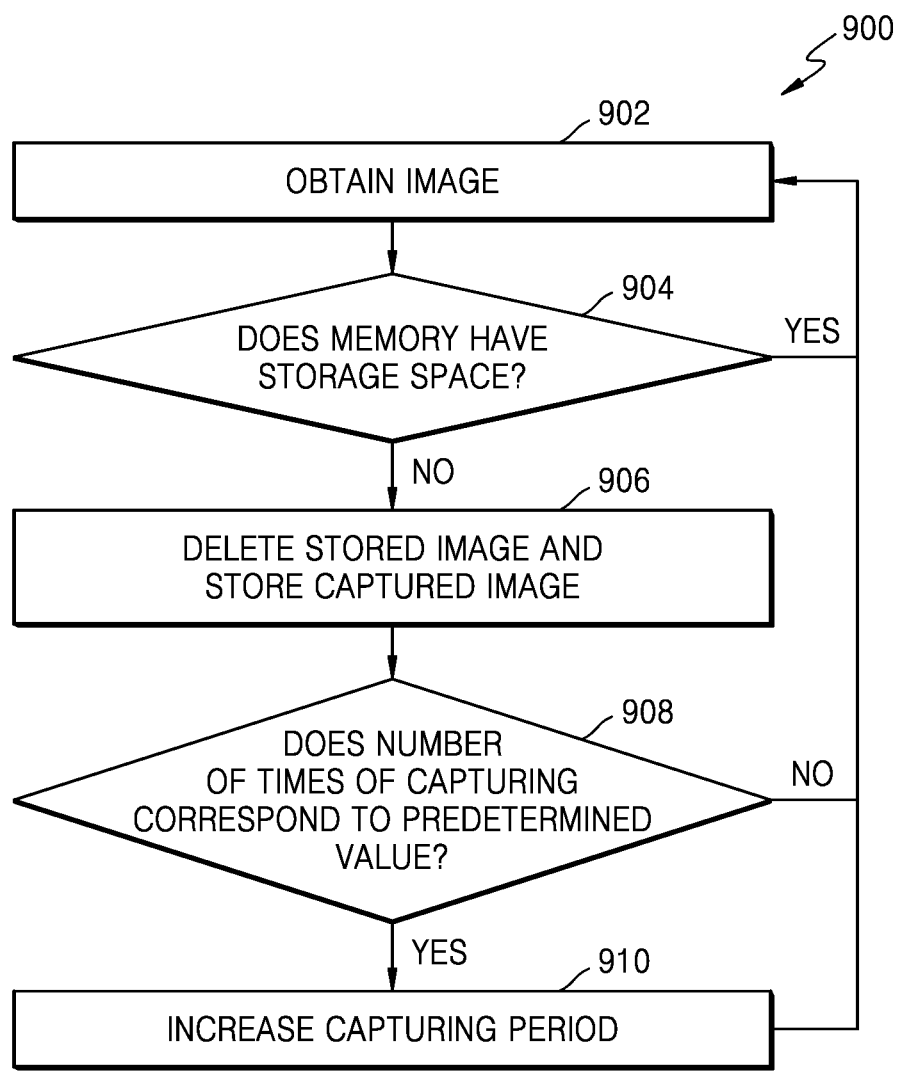
FIG. 9 is a flowchart for describing a method, performed by a home appliance device, of storing an image by using an equality mode, according to an embodiment of the disclosure.

FIG. 9 is a flowchart for describing a method, performed by the home appliance device 100, of storing an image by using an equality mode, according to an embodiment of the disclosure.

In operation 902, the home appliance device 100 may obtain an image.

In operation 904, the home appliance device 100 may identify whether there is a storage space in a memory. For example, when the home appliance device 100 is able to store 300 pieces of images, the home appliance device 100 may identify whether images stored in the memory correspond to 300 pieces. When the stored images in the memory correspond to less than 300 pieces of images, and thus, there is an image storage space, the home appliance device 100 may store the obtained image and may perform operation

902. When the stored images in the memory correspond to 300 pieces of images, and thus, there is no image storage space, the home appliance device 100 may perform operation 906.

In operation 906, the home appliance device 100 may delete one of the stored images and may store the obtained image. According to an embodiment of the disclosure, the method of storing one image may be an equality mode for allowing the stored images to have an equal time interval. The method, performed by the home appliance device 100, of storing an image by using the equality mode is described in more detail with reference to FIGS. 10A and 10B.

In operation 908, the home appliance device 100 may identify whether the number of times of obtainment corresponds to a predetermined value. For example, when the home appliance device 100 is able to store 300 pieces of images, the home appliance device 100 may identify whether the number of times of obtainment corresponds to 300, 450, 600, etc. When the number of times of obtainment does not correspond to the predetermined value, the home appliance device 100 may perform operation 902, and when the number of times of obtainment corresponds to the predetermined value, the home appliance device 100 may perform operation 910.

In operation 910, when the number of times of obtainment corresponds to the predetermined value, the home appliance device 100 may increase an obtainment period. For example, when the home appliance device 100 is able to store 300 pieces of images, and images are obtained with an interval of 1 second until the number of times of obtainment corresponds to obtainment of 300 pieces of images, the home appliance device 100 may increase the obtainment to 2 seconds. In this case, while the home appliance device 100 obtains next 150 pieces of images, the home appliance device 100 may equally delete images and store obtained images, so that after the home appliance device 100 obtains 450 pieces of images, an obtainment time interval between obtained images may become 2 seconds.

While the home appliance device 100 performs a main operation, the home appliance device 100 may repeatedly perform operations 902 through 910.

Figure 10A:
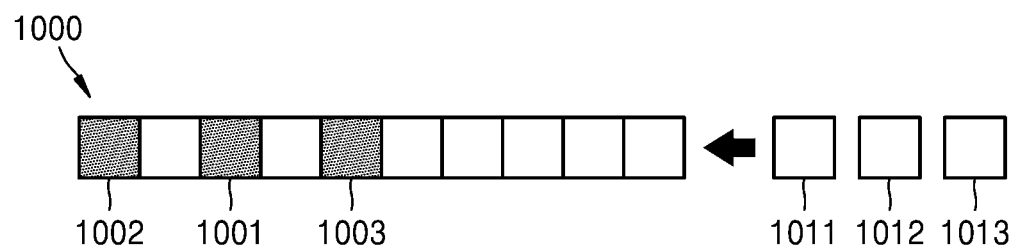
FIG. 10A is a view for describing a method, performed by a home appliance device, of storing an image by using an equality mode, according to an embodiment of the disclosure.

FIG. 10A is a view for describing a method, performed by the home appliance device 100, of storing an image by using an equality mode, according to an embodiment of the disclosure.

The home appliance device 100 may store a plurality of images 1000. When an image 1011 is obtained, the home appliance device 100 may delete one image 1001 from among the stored images and may store the obtained image 1011. When images are repeatedly obtained, the home appliance device 100 may delete images 1001, 1002, and 1003 stored at an odd number of times and may store obtained images 1011, 1012, and 1013.

By deleting the images 1001, 1002, and 1003 stored at the odd number of times and storing the obtained images, the home appliance device 100 may increase the obtainment interval between the stored images (e.g., by a factor of N, where N is a natural integer greater than 1, and/or by a set amount). However, according to this method, while images stored at an early phase from among the stored images may have an increased obtainment interval, images stored at a latter phase may not have the increased obtainment interval. When the obtainment interval is not equally increased, a time-lapse video, in which a proportion of images of a predetermined section is increased, may be generated. For example, while images that are stored before the image 1003, which is deleted last, may have an obtainment interval of 2 seconds, images that are stored after the image 1003, which is deleted last, may have an obtainment interval of 1 second, and accordingly, the images stored after the image 1003 lastly deleted may have an increased proportion in the time-lapse video.

Figure 10B:
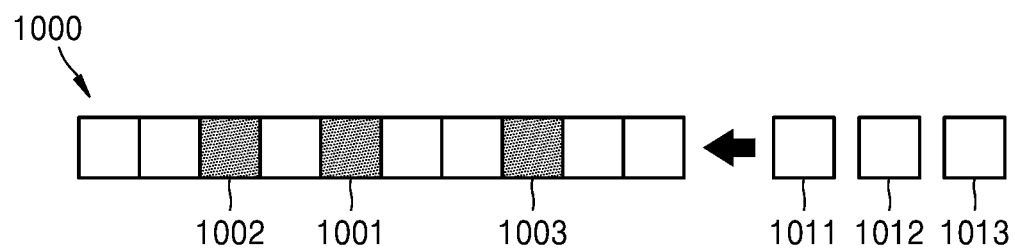
FIG. 10B is a view for describing a method, performed by a home appliance device, of storing an image by using an equality mode, according to an embodiment of the disclosure.

FIG. 10B is a view for describing a method, performed by the home appliance device 100, of storing an image by using an equality mode, according to an embodiment of the disclosure.

In order to equally delete and store images throughout the entire time section, the home appliance device 100 may alternately delete images stored in an initial phase and images stored in a latter phase.

According to an embodiment of the disclosure, according to the method, performed by the home appliance device 100, of deleting the image, images may be deleted in an order of $\frac{1}{2} \rightarrow \frac{1}{4} \rightarrow \frac{3}{4} \rightarrow \frac{1}{8} \rightarrow \frac{7}{8} \rightarrow \frac{3}{8} \rightarrow \frac{5}{8}$ from among the total images. For example, when the home appliance device 100 stores 10 images, the home appliance device 100 may delete the 5th image 1001 corresponding to a middle stage, delete the 3rd image 1002 stored in an initial stage, delete the 8th image 1003 stored in a latter stage, delete the 2nd image stored in the initial stage, and delete the 9th image stored in the latter stage. By repeating this operation, the home appliance device 100 equally delete the images throughout the entire time section.

By alternately deleting the images stored in the initial stage and the images stored in the latter stage, the home appliance device 100 may store the images such that a proportion of images of a predetermined section is not increased.

Figure 11:
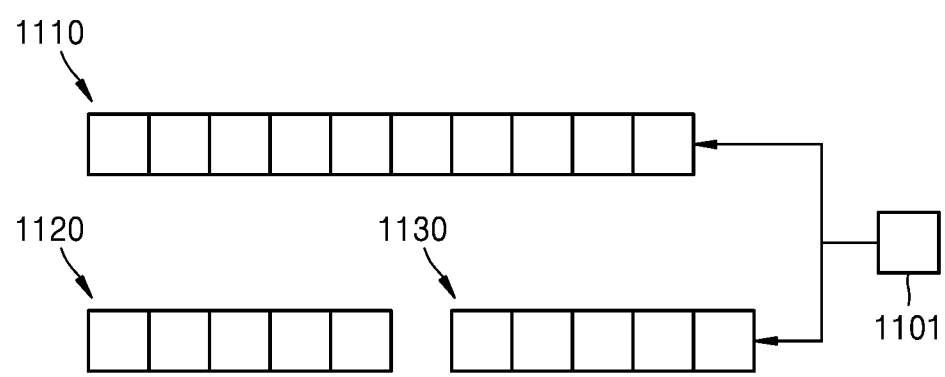
FIG. 11 is a view for describing a method, performed by a home appliance device, of storing an image by using a highlight mode, according to an embodiment of the disclosure.

FIG. 11 is a view for describing a method, performed by the home appliance device 100, of storing an image by using a highlight mode, according to an embodiment of the disclosure.

According to an embodiment of the disclosure, the home appliance device 100 may store images by classifying the images into a plurality of image groups. The home appliance device 100 may store an obtained image 1101 in an image group 1110. For example, the home appliance device 100 may store the obtained image 1101 in the image group 1110 by using an equality mode or an emphasis mode. For example, 300 pieces of images may be stored in the image group 1110.

According to an embodiment of the disclosure, the home appliance device 100 may calculate a time difference and a feature value of the obtained image 1101 and may store the obtained image 1101 in a second highlight group 1130 based on the calculated time difference and feature value. For example, when the time difference and the feature value of the obtained image 1101 are greater than or equal to a threshold value, the home appliance device 100 may store the obtained image 1101 in the second highlight group 1130. The home appliance device 100 may store the obtained image 1101 in the image group 1110, in addition to the second highlight group 1130.

According to an embodiment of the disclosure, the home appliance device 100 may calculate a total score of the time difference and the feature value of the obtained image 1101 and may store the obtained image 1101 in the second highlight group 1130 when the calculated total score is greater than or equal to a threshold value. When the time difference and the feature value of the obtained image 1101 are less than the threshold value or the total score of the obtained image 1101 is less than the threshold value, the home appliance device 100 may compare the second highlight group 1130 with a first highlight group 1120. For example, the home appliance device 100 may compare the first highlight group 1120 including images obtained between 1 second through 3 seconds with the second highlight group 1130 including images obtained between 7 seconds and 10 seconds.

The home appliance device 100 may compare the first highlight group 1120 with the second highlight group 1130 with respect to at least one of time differences, feature values, or total scores of the first high light group 1120 and the second highlight group 1130. When a comparison value of the first highlight group 1120 is less than or equal to a comparison value of the second highlight group 1130, the home appliance device 100 may delete the images included in the first highlight group 1120 and may store, in the first highlight group 1120, the images included in the second highlight group 1130.

The home appliance device 100 may store, in the first highlight group 1120, images having great time differences and feature values. A method, performed by the home appliance device 100, of generating a time-lapse video by using the first highlight group 1130 is described in more detail with reference to FIG. 12.

Figure 12:
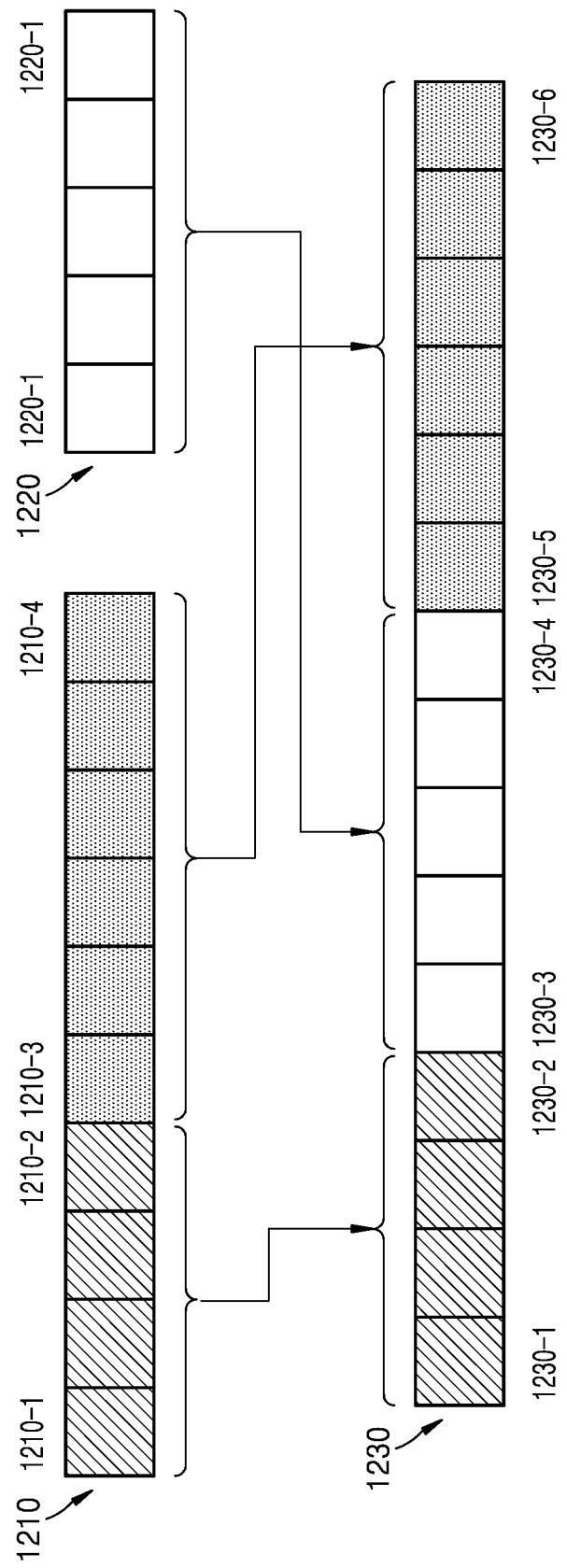
FIG. 12 is a view for describing a method, performed by a home appliance device, of generating a time-lapse video by using a highlight mode, according to an embodiment of the disclosure.

FIG. 12 is a view for describing a method, performed by the home appliance device 100, of generating a time-lapse video by using a highlight mode, according to an embodiment of the disclosure.

Referring to FIG. 12, the home appliance device 100 may store an image group 1210 and a first highlight group 1220. The image group 1210 may denote the image group 1110 of FIG. 11, and the first highlight group 1220 may denote the first highlight group 1120 of FIG. 11.

The home appliance device 100 may identify times at which images included in the first highlight group 1220 are obtained and may merge the images in the image group 1210 to generate a final image group 1230. According to an embodiment of the disclosure, the home appliance device 100 may identify a time at which an image 1220-1, stored first from among the images of the first highlight group 1220, is obtained and may identify, in the image group 1210, an image 1210-2 obtained before the image 1220-1 and lastly stored. Alternatively or additionally, the home appliance device 100 may identify a time at which an image 1220-2, lastly stored from among the images of the first highlight group 1220, is obtained and may identify, in the image group 1210, an image 1210-3 obtained after the image 1220-2 and stored first.

The home appliance device may generate the final image group 1230 by adding the images of the first highlight group 1220 between the two identified images 1210-2 and 1210-3.

Figure 13:
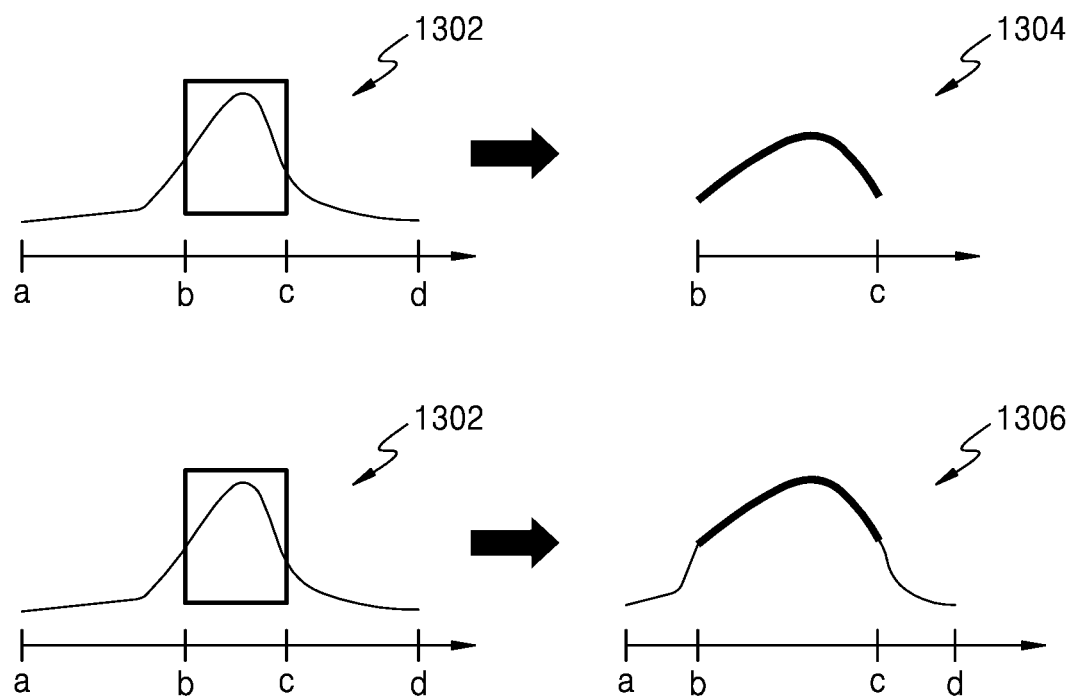
FIG. 13 is a view for describing the characteristics of a time-lapse video generated by a home appliance device, according to an embodiment of the disclosure.

FIG. 13 is a view for describing the characteristics of a time-lapse video generated by the home appliance device 100, according to an embodiment of the disclosure.

According to an embodiment of the disclosure, the home appliance device 100 may compare an obtained image with stored images in real time and store an image in a situation when an ending time of an operation is not determined. The home appliance device 100, according to an embodiment of the disclosure, may store images by including images of all sections, rather than images of a predetermined section, from among the entire obtained images, and increasing a proportion of images having great changes.

For example, a graph 1302 illustrates feature values of images obtained by the home appliance device 100 during an a-d time section. Images obtained during an a-b time section and images obtained during a c-d time section may have a less amount of change of image than images obtained during a b-c time section. That is, the b-c time section is a time section in which the obtained images have a great difference from previous images.

For example, a graph 1304 illustrates an example in which the home appliance device stores images to include only the images of the b-c time section in which the amount of change is great. The home appliance device may store only images of a time section in which the amount of change is great and may use the stored images to generate a time-lapse video.

A graph 1306 illustrates an example in which the home appliance device 100 stores images by including all of the images obtained during the entire a-d time section while increasing the proportion of the images of the b-c time section in which the amount of change is great. Thus, a user may identify the images obtained during the entire a-d time section, even when the images do not have a great amount of change. Alternatively or additionally, the images obtained during the b-c time section in which the amount of change is great have a higher proportion in the graph 1306 than in the graph 1302. That is, with respect to generation of a time-lapse video, a dynamic time-lapse video may be obtained by increasing the proportion of the images of the time section in which the amount of change is great.

Figure 14:
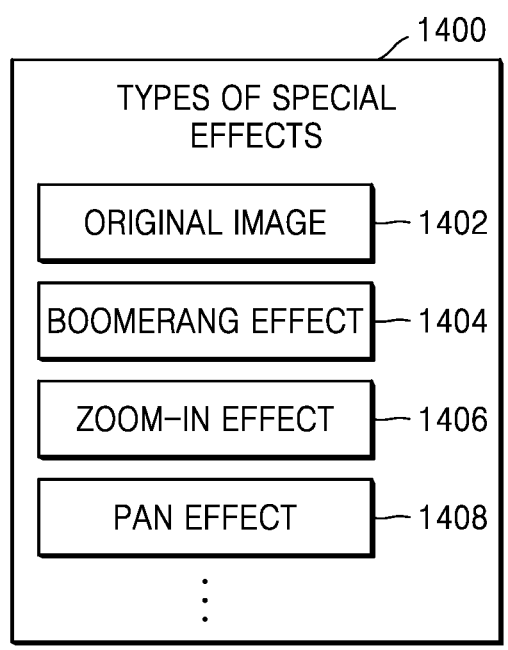
FIG. 14 is a view for describing types of special effects for generating a time-lapse video, according to an embodiment of the disclosure.

FIG. 14 is a view for describing types of special effects for generating a time-lapse video, according to an embodiment of the disclosure, and FIGS. 15A through 15D are views for describing an example of special effects for generating a time-lapse video, according to embodiments of the disclosure.

According to an embodiment of the disclosure, when generating a time-lapse video, the home appliance device 100 may use a special effect in the video. The home appliance device 100 may display types of special effects 1400 on a display, may receive an input of selecting a special effect from a user, and may apply the selected special effect.

For example, the types of special effects 1400 may include an original image 1402, a boomerang effect 1404, a zoom-in effect 1406, or a pan effect 1408.

The original image 1402 may denote an image having no effect applied thereto. According to an embodiment of the disclosure, referring to FIG. 15A, when the special effect is the original image, the home appliance device 100 may store and use a plurality of images 1501, 1502, and 1503 without any effect.

The boomerang effect 1404 may denote repeated reproduction and reverse reproduction of an image. According to an embodiment of the disclosure, referring to FIG. 15B, when the special effect is the boomerang effect, the home appliance device 100 may sequentially sort the plurality of images 1501, 1502, and 1503, and then reversely sort the plurality of images 1502 and 1501 and may repeat this operation, thereby repeating the reproduction and the reverse reproduction of the image.

The zoom-in effect 1406 may denote an effect of gradually enlarging an obtained image. According to an embodiment of the disclosure, referring to FIG. 15C, when the special effect is the zoom-in effect, the home appliance device 100 may gradually enlarge the plurality of images 1501, 1502, and 1503.

Figure 15A:
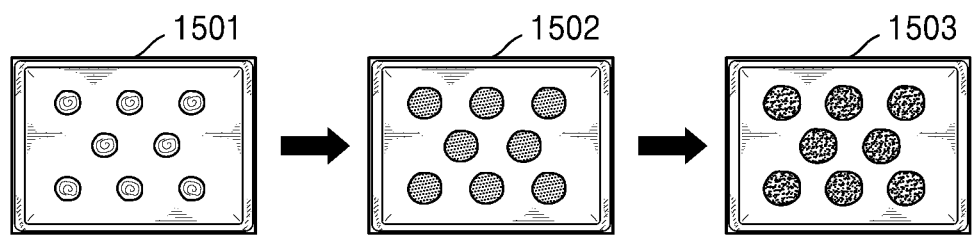
FIG. 15A is a view for describing an example of special effects for generating a time-lapse video, according to an embodiment of the disclosure.
Figure 15B:
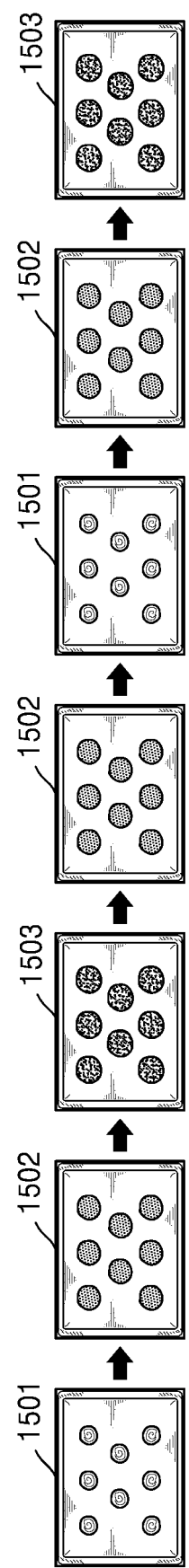
FIG. 15B is a view for describing an example of special effects for generating a time-lapse video, according to an embodiment of the disclosure.
Figure 15C:
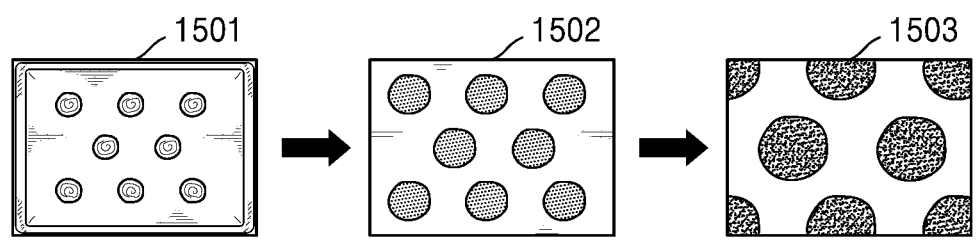
FIG. 15C is a view for describing an example of special effects for generating a time-lapse video, according to an embodiment of the disclosure.
Figure 15D:
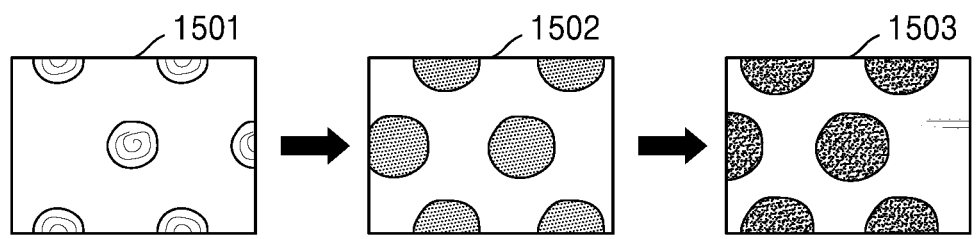
FIG. 15D is a view for describing an example of special effects for generating a time-lapse video, according to an embodiment of the disclosure.

The pan effect 1408 may denote an effect of obtaining an image via movement of a camera, the effect being obtained by changing an enlarged image area. Referring to FIG. 15D, when the special effect is the pan effect, the home appliance device 100 may generate an effect of obtaining images via movement of a camera in a right direction, by moving enlarged areas of the plurality of images 1501, 1502, and 1503 in the right direction.

Figure 16:
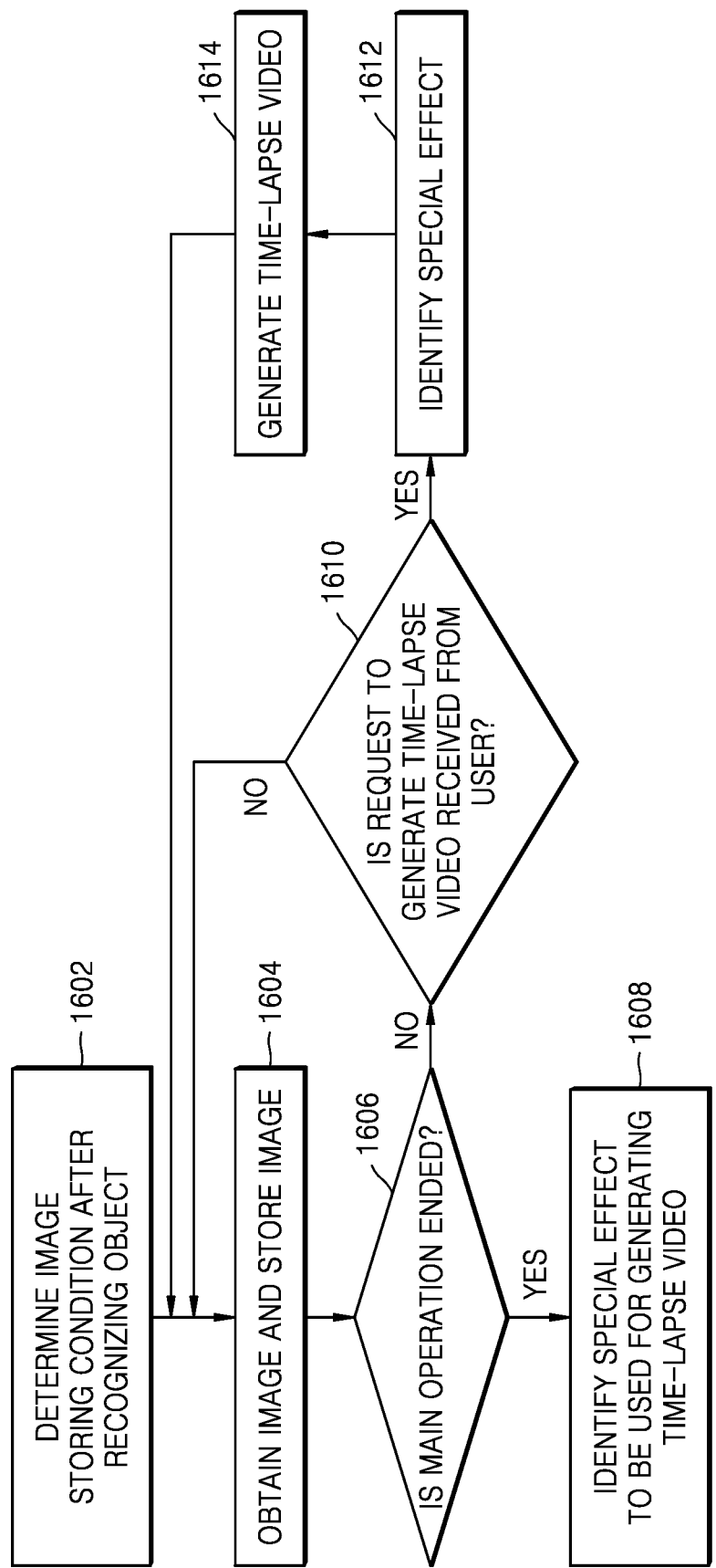
FIG. 16 is a view for describing a method of generating a time-lapse video in response to a user's request to generate a video, according to an embodiment of the disclosure.

FIG. 16 is a view for describing a method of generating a time-lapse video in response to a user's request to generate a video, according to an embodiment of the disclosure.

In operation 1602, a home appliance device may determine an image storing condition after recognizing an object. Operation 1602 may correspond to operation 406 of FIG. 4.

In operation 1604, the home appliance device may obtain and store an image. Operation 1604 may correspond to operation 408 and operation 410.

In operation 1606, the home appliance device may identify whether or not a main operation is ended. When the main operation is ended, the home appliance device may move to operation 1608. When the main operation is not ended, the home appliance device may move to operation 1610.

In operation 1610, the home appliance device may identify whether or not a request to generate a time-lapse video is received. According to an embodiment of the disclosure, while the home appliance device performs the main operation, the home appliance device may obtain a request to generate a time-lapse video. For example, the home appliance device may receive a user's request to generate a time-lapse video by using an input interface. When the home appliance device does not receive the request to generate a time-lapse video, the home appliance device may move to operation 1604, and when the home appliance device receives the request to generate a time-lapse video, the home appliance device may move to operation 1612.

In operation 1612, the home appliance device may identify a special effect, and in operation 1614, the home appliance device may generate a time-lapse video. The home appliance device may repeatedly obtain and store the images while performing the main operation, and even while the main operation is performed, the home appliance device may generate the time-lapse video.

Figure 17:
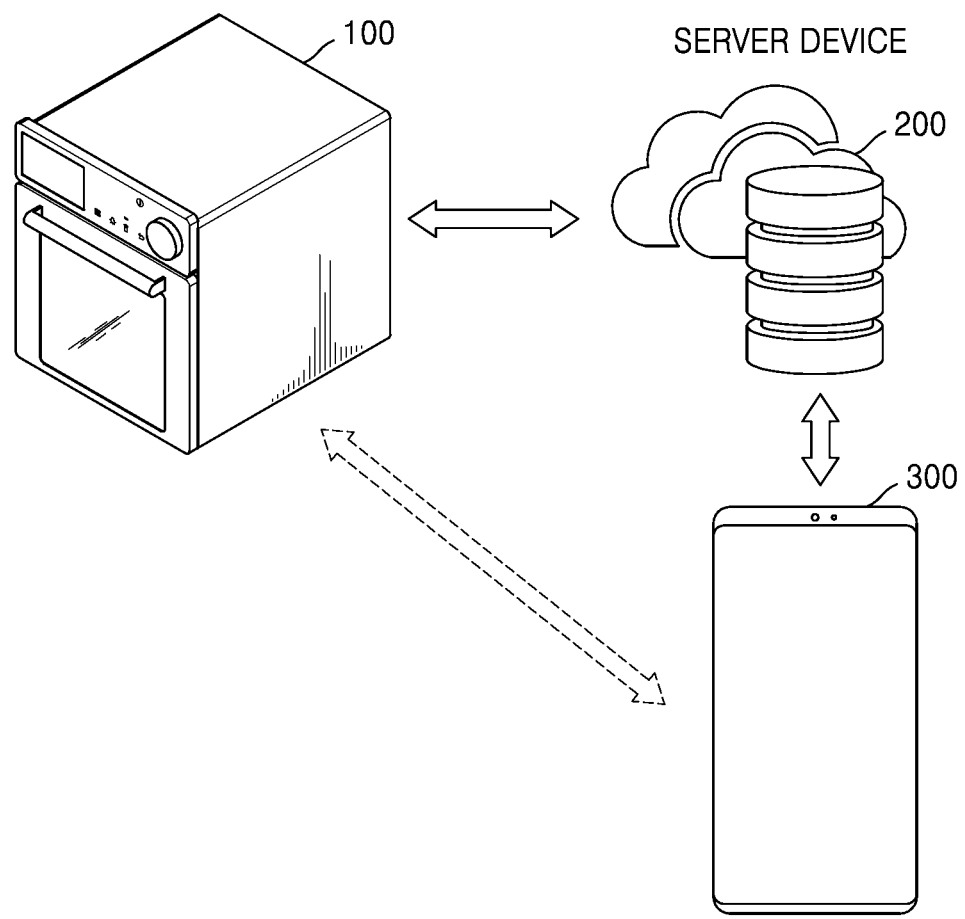
FIG. 17 is a view for describing an operation in which a home appliance device is synchronized with a server device, according to an embodiment of the disclosure.

FIG. 17 is a view for describing an operation in which the home appliance device 100 is synchronized with a server device 200, according to an embodiment of the disclosure.

Referring to FIG. 17, according to an embodiment of the disclosure, the home appliance device 100 may be synchronized with the server device 200 and a display device 300.

According to an embodiment of the disclosure, the server device 200 may include a communication interface for performing communication with an external device. The server device 200 may perform communication with the home appliance device 100 or the display device 300 through the communication interface. According to an embodiment of the disclosure, the home appliance device 100 may transmit identification information of the home appliance device 100 or identification information of a user (login information and account information) to the server device 200 and may receive authentication of the identification information of the home appliance device 100 or the identification information of the user (the login information and the account information) from the server device 200 to access the server device 200.

According to an embodiment of the disclosure, the server device 200 may include an AI processor. The AI processor may train an artificial neural network and generate an AI model for recognizing an object (e.g., a food material, a dish, etc.). To "train" the AI neural network may denote to make an arithmetic model capable of making an optical decision making via connection of neurons constituting an AI neural network by appropriately changing a weight of data.

The display device 300, according to an embodiment of the disclosure, may be connected to the server device 200 and may display information provided by the server device 200. According to an embodiment of the disclosure, the display device 300 may transmit and receive information to and from the server device 200 through a specific application (e.g., a home appliance device management application) installed in the display device 300.

According to an embodiment of the disclosure, the display device 300 may be a device connected via the same account information as the home appliance device 100. The display device 300 may be directly connected to the home appliance device 100 through a short-range wireless communication channel or may be indirectly connected to the home appliance device 100 through the server device 200.

The display device 300, according to an embodiment of the disclosure, may be realized in various forms. For example, the display device 300 described in the disclosure may include a mobile terminal, a refrigerator including a display, a television (TV), a computer, etc., but is not limited thereto. Alternatively or additionally, the mobile terminal may include a smartphone, a laptop computer, a tablet personal computer (PC), a digital camera, an electronic book terminal, a digital broadcasting terminal, a personal digital assistant (PDA), a portable multimedia player (PMP), a navigation device, an MP3 player, etc., but is not limited thereto. For example the mobile terminal may be a wearable device which may be worn by a user. Hereinafter, for convenience of explanation, an example in which the display device 300 is a smartphone is described.

According to an embodiment of the disclosure, the display device 300 or the home appliance device 100 may receive a sound signal, which is an analog signal, through a microphone and may convert a sound portion to computer-readable text by using an ASR model. The display device 300 or the home appliance device 100 may interpret the converted text by using an NLU model and obtain an intention of an utterance of a user. Here, the ASR model or the NLU model may be an AI model. The AI model may be processed by an AI-dedicated processor designed to have a hardware structure specialized for processing an AI model. The AI model may be formed through training. The training may be performed directly by a device performing AI (e.g., the display device 300 or the home appliance device 100) or may be performed by an additional device, such as the server device 200 and/or a system. Examples of a learning algorithm may include, but is not limited to, supervised learning, unsupervised learning, semi-supervised learning, or reinforcement learning.

The AI model may include a plurality of neural network layers. The plurality of neural network layers may respectively have a plurality of weight values and may perform calculation using a calculation result of a previous layer and the plurality of weight values. The plurality of weight values owned by the plurality of neural network layers may be optimized by training results of the AI model. For example, the plurality of weight values may be updated to reduce or minimize a loss value or a cost value obtained by the AI model during a training procedure. An artificial neural network may include, for example, a convolutional neural network (CNN), a deep neural network (DNN), a recurrent neural network (RNN), a restricted Boltzmann machine (RBM), a deep belief network (DBN), a bidirectional recurrent deep neural network (BRDNN), or a deep Q-network, but is not limited thereto.

According to an embodiment of the disclosure, the display device 300 may execute a specific application (e.g., a home appliance device management application) provided by the server device 200, based on a user input. In this case, a user may identify a monitoring video or a cooking process video of an inner space of the home appliance device 100, through an execution screen of the application. An operation, performed by the user, of receiving a time-lapse video by using the specific application (e.g., the home appliance device management application) provided by the server device 200, is described in detail with reference to FIG. 18.

Figure 18:
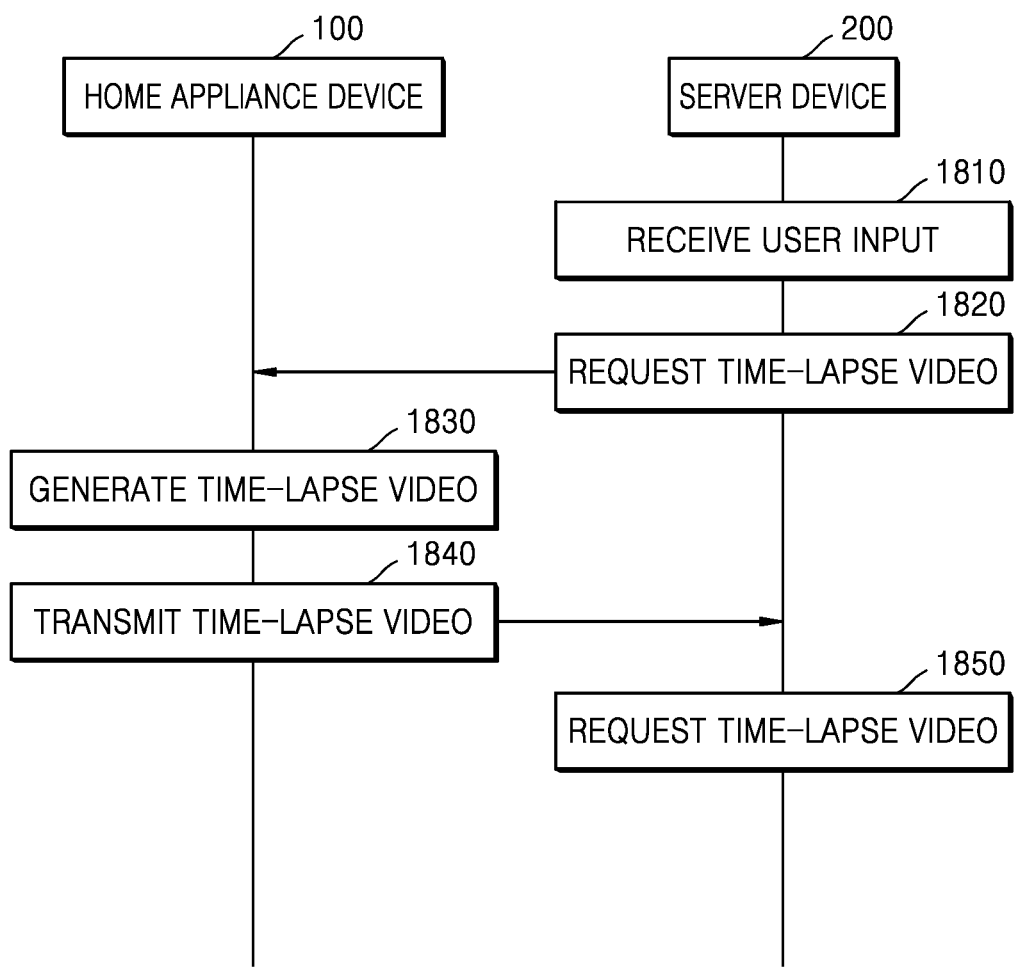
FIG. 18 is a view for describing an operation, performed by a home appliance device, of providing a monitoring video to a server device, according to an embodiment of the disclosure.

FIG. 18 is a view for describing an operation, performed by a home appliance device, of providing a monitoring video to a server device, according to an embodiment of the disclosure.

In operation 1810, the server device 200, according to an embodiment of the disclosure, may receive a user input through a display device. According to an embodiment of the disclosure, the server device 200 may receive the user input through an execution screen of a specific application installed in the display device. The user input may include an input of requesting a cooking process video of the home appliance device 100. The cooking process video may denote a video including frames from a starting time point of the cooking to a present time point or frames from the starting time point of the cooking to a completion time point of the cooking. The cooking process video may include a time-lapse video.

In operation 1820, the server device 200, according to an embodiment of the disclosure, may request a time-lapse video from the home appliance device 100, based on the user input.

According to an embodiment of the disclosure, when the server device 200 receives the user input of requesting a time-lapse video of the home appliance device 100, the server device 200 may transmit a signal to request a time-lapse video of an inner space of the home appliance device 100. Alternatively or additionally, when the server device 200 receives a user input of requesting a cooking process video through the display device, the server device 200 may transmit a signal to request a cooking process video to the home appliance device 100.

In operation 1830, the home appliance device 100, according to an embodiment of the disclosure, may generate the time-lapse video based on stored images.

In operation 1840, the home appliance device 100 may transmit a captured monitoring video to the server device 200.

In operation 1850, the server device 200 may provide the time-lapse video through the display device. For example, the display device 300 may display the time-lapse video provided by the server device 200 on an execution screen of an installed application. For example, the display device 300 may display a monitoring video on a live screen.

For example, it is described with reference to FIG. 18 that the home appliance device 100 may generate the time-lapse video and transmit the generated time-lapse video to the server device 200 at a time point at which the home appliance device 100 receives the signal to request the monitoring video. However, the disclosure is not limited thereto. Even when the request of the server device 200 is not received, the home appliance device 100 may generate a time-lapse video and transmit the time-lapse video to the server device 200 when a main operation of the home appliance device 100 is ended.

Figure 19:
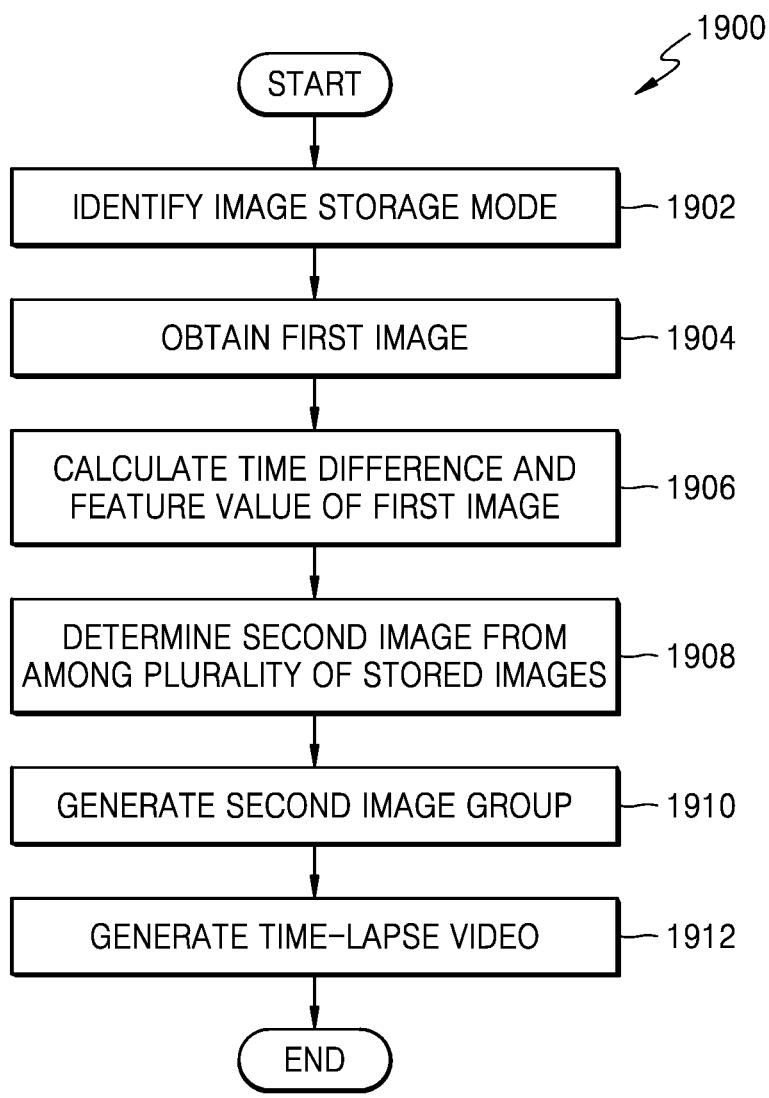
FIG. 19 is a flowchart for describing a method, performed by a home appliance device, of generating a time-lapse video, according to an embodiment of the disclosure.

FIG. 19 is a flowchart for describing a method, performed by the home appliance device 100, of generating a time-lapse video, according to an embodiment of the disclosure.

In operation 1902, the home appliance device 100 may identify an image storage mode. According to an embodiment of the disclosure, the image storage mode may include at least one of an equality mode, an emphasis mode, or a highlight mode.

In operation 1904, the home appliance device 100 may obtain a first image. According to an embodiment of the disclosure, the home appliance device 100 may obtain the first image by capturing an image through the camera 110. According to an embodiment of the disclosure, the home appliance device 100 may obtain an image according to a predetermined obtainment period.

In operation 1906, the home appliance device 100 may calculate a time difference and a feature value of the first image. According to an embodiment of the disclosure, when the identified image storage mode is the emphasis mode for emphasizing one or more images, the home appliance device 100 may calculate the time difference and the feature value of the first image. For example, the time difference may be calculated based on a difference of an obtainment time between two images, and the feature value may be calculated by using a difference of a pixel value between the two images.

In operation 1908, the home appliance device 100 may determine a second image from among a plurality of stored images. The home appliance device 100 may calculate a time difference and a feature value of each of the plurality of stored images and may determine a second image based on the calculated time difference and feature value. For example, the home appliance device 100 may calculate a total score based on the time difference and the feature value and may determine an image having a least total score from among the plurality of images as the second image.

In operation 1910, the home appliance device 100 may generate a second image group by deleting one from among the plurality of stored images and adding an obtained image. For example, the home appliance device 100 may compare the second image determined from among a first image group including the stored images with the obtained image. According to an embodiment of the disclosure, when the total score of the second image is less than a total score of the obtained image, the home appliance device 100 may delete the second image and store the obtained image to generate the second image group which includes, in the first image group, the obtained image, instead of the second image.

In operation 1912, the home appliance device 100 may generate a time-lapse video by using the plurality of images included in the second image group. For example, the home appliance device 100 may generate a 20-fps time-lapse video of a length of 15 seconds from 300 pieces of images having an obtainment period of 1 second.

Figure 20:
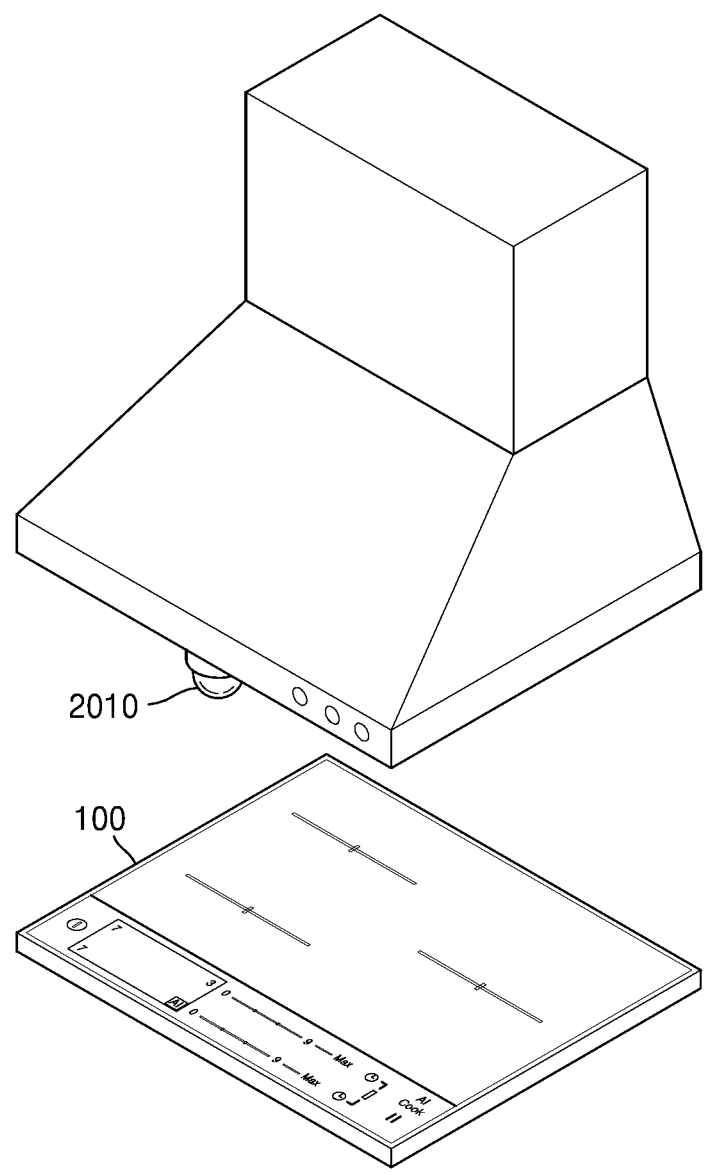
FIG. 20 is a view for describing a method, performed by a home appliance device, of storing an image by obtaining the image from a capturing device, according to an embodiment of the disclosure.

FIG. 20 is a view for describing a method, performed by the home appliance device 100, of storing an image by obtaining the image from a capturing device 2010, according to an embodiment of the disclosure. For convenience of explanation, FIG. 20 illustrates a case in which the home appliance device 100 is an induction device. However, the home appliance device 100 is not limited thereto. The home appliance device 100 may obtain, from the capturing device 2010, an image generated by capturing the home appliance device 100 and may store the obtained image.

According to an embodiment of the disclosure, the capturing device 2010 may be an external capturing device connected to the home appliance device 100 through the communicator 150. According to an embodiment of the disclosure, the capturing device 2010 may be the camera 110 connected to the home appliance device 100 in a wired manner. According to an embodiment of the disclosure, the home appliance device 100 may control a capturing period of the capturing device 2010. For example, when the home appliance device 100 determines to increase the capturing period, the home appliance device 100 may control the capturing period of the capturing device 2010 to be increased by transmitting a signal through the communicator 150.

The home appliance device 100 may store the image obtained from the capturing device 2010 by using the method of storing the image of FIGS. 4 through 12 and 16. Alternatively or additionally, the home appliance device 100 may generate a time-lapse video based on the stored images.

Figure 21:
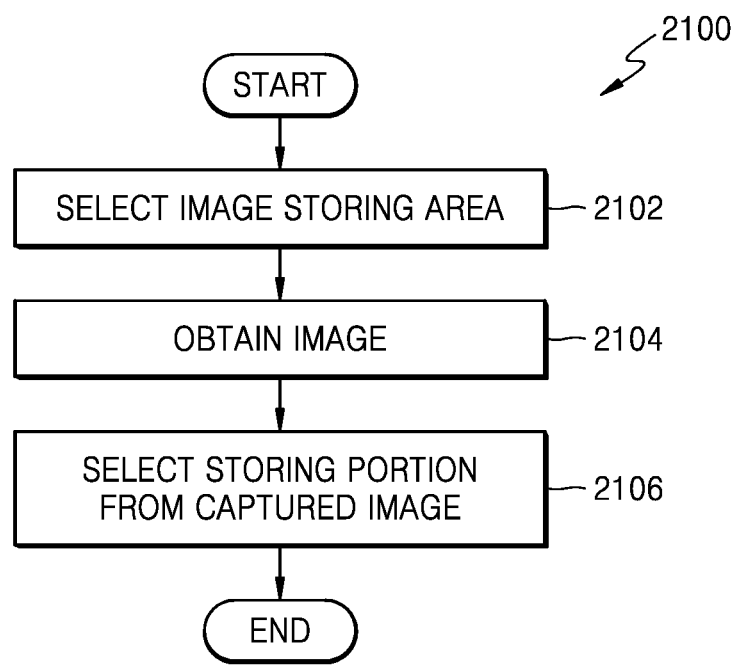
FIG. 21 is a flowchart for describing a method of storing an image, according to an embodiment of the disclosure.

FIG. 21 is a flowchart for describing a method of storing an image, according to an embodiment of the disclosure. According to an embodiment of the disclosure, the home appliance device 100 may select one or more portions of an image obtained through the camera 110 and may compare or store images corresponding to the selected portions.

In operation 2102, the home appliance device 100 may select an image storing area. For example, the home appliance device 100 may select one or more portions of the obtained image area. As another example, the camera 110 of the home appliance device 100 may capture an image of a predetermined angle of view, and the home appliance device 100 may select one or more portions of an image area which may be captured by the camera 110.

In operation 2104, the home appliance device 100 may obtain the image through the camera 110. Alternatively or additionally, in operation 2016, the home appliance device 100 may crop the image to include portions of the obtained image, the portions corresponding to the one or more portions selected in operation 2012. According to an embodiment of the disclosure, the cropped image may be compared with stored images and may be stored according to the method of storing an image of FIGS. 4 through 12 and 16.

The method, according to an embodiment of the disclosure, may be realized in the form of a program command which may be executed by various computing devices and may be recorded on a computer-readable medium. The program commands recorded on the computer-readable recording medium may be specially designed and constructed for the disclosure or may be known to and usable by one of ordinary skill in a field of computer software. The program commands recorded on the computer-readable recording medium may be specially designed and constructed for the disclosure or may be known to and usable by one of ordinary skill in a field of computer software. Examples of the computer-readable medium include magnetic media (e.g., hard discs, floppy discs, or magnetic tapes), optical media (e.g., compact disc-read only memories (CD-ROMs), or digital versatile discs (DVDs)), magneto-optical media (e.g., floptical discs), and hardware devices that are specially configured to store and carry out program commands (e.g., ROMs, RAMs, or flash memories). Examples of the program commands include a high-level language code that may be executed by a computer using an interpreter as well as a machine language code made by a complier.

One or more embodiments of the disclosure may be implemented by a recording medium including an instruction executable by a computer, such as a program module executed by a computer. Computer-readable media may be arbitrary media which may be accessed by computers and may include volatile and non-volatile media, and detachable and non-detachable media. Also, the computer-readable media may include computer storage media and communication media. The computer storage media include all of volatile and non-volatile media, and detachable and non-detachable media which are designed as methods or techniques to store information including computer-readable instructions, data structures, program modules, or other data. The communication media include transmission mechanisms or other data of modulated data signals, such as computer-readable instructions, data structures, and program modules. Also, the communication media include other information transmission media. Also, one or more embodiments of the disclosure may also be implemented by a computer program or a computer program product including a computer-executable instruction, such as a computer program executed by a computer.

A device-readable storage medium may include a form of a non-transitory storage medium. Here, the "non-transitory storage medium" only denotes a tangible device and does not contain a signal (e.g., electromagnetic waves). This term does not distinguish a case where data is stored in the storage medium semi-permanently and a case where the data is stored in the storage medium temporarily. For example, the "non-transitory storage medium" may include a buffer where data is temporarily stored.

According to an embodiment, a method according to various embodiments disclosed in the present specification may be provided by being included in a computer program product. The computer program product may be transacted between a seller and a purchaser. The computer program product may be distributed in a form of machine-readable storage medium (e.g., a CD-ROM), or distributed (e.g., downloaded or uploaded) through an application store or directly or online between two user devices (e.g., smart phones). In the case of online distribution, at least a part of the computer program product (e.g., a downloadable application) may be at least temporarily generated or temporarily stored in a machine-readable storage medium, such as a server of a manufacturer, a server of an application store, or a memory of a relay server.

According to an aspect of the disclosure, a method of generating a time-lapse video may be provided. The method may include identifying an image storage mode. The method may include obtaining a first image. The method may include based on identifying that the image storage mode is an emphasis mode for emphasizing one or more images, obtaining a first time difference between the first image and a stored image, and a first feature value indicating a first amount of change between the first image and the stored image. The method may include for each respective image of a first plurality of images of a first image group stored in a memory, identifying a second image from among the first plurality of images, based on a second time difference between the respective image and the second image and a second feature value indicating a second amount of change between the respective image and the stored image. The method may include based on the first time difference, the first feature value, the second time difference, and the second feature value, generating a second image group by removing the second image from the first image group and adding the first image to the first image group. The method may include generating the time-lapse video by using a second plurality of images of the second image group.

According to an embodiment of the disclosure, the identifying the second image may include obtaining a total score corresponding to a weighted average of the second time difference and the second feature value of each respective image of the first plurality of images. The identifying the second image may include comparing the total scores of the first plurality of images and identifying the second image corresponding to a minimum total score.

According to an embodiment of the disclosure, the generating the second image group may include obtaining a first total score of the first image, the first total score corresponding to a first weighted average of the first time difference and the first feature value. The generating the second image group may include obtaining a second total score of the second image, the second total score corresponding to a second weighted average of the second time difference and the second feature value. The generating the second image group may include based on the first total score being greater than or equal to the second total score, generating the second image group by removing the second image from the first image group and adding the first image to the first image group.

According to an embodiment of the disclosure, the method may further include based on the first total score being greater than or equal to a threshold value, adding the first image to a second highlight image group. The method may further include based on the first total score being less than the threshold value, obtaining a second average total score of a second plurality of highlight images included in the second highlight image group. The method may further include based on the second average total score being greater than or equal to a first average total score of a first highlight image group, removing a first plurality of highlight images included in the first highlight image group and adding the second plurality of highlight images included in the second highlight image group to the first highlight image group.

According to an embodiment of the disclosure, the generating the time-lapse video may include sorting the second plurality of images of the second image group and the first plurality of highlight images included in the first highlight image group according to a time order. The generating the time-lapse video may include generating the time-lapse video by using the sorted plurality of images.

According to an embodiment of the disclosure, the method may further include obtaining a user input indicating a type of a special effect selected by a user. The generating the time-lapse video by using the sorted plurality of images may include modifying the first plurality of highlight images of the first highlight image group by using the type of the special effect.

According to an embodiment of the disclosure, the method may further include based on identifying that the image storage mode is an equality mode for equally storing a scene of an image, identifying a number of times of image obtainment. The method may further include changing an obtainment period of the first image, based on the number of times of the image obtainment being a predetermined value.

According to an embodiment of the disclosure, the method may further include obtaining a user input associated with generation of the time-lapse video. The method may further include based on the user input associated with the generating the time-lapse video, sorting a plurality of stored images according to a time order. The method may further include generating the time-lapse video based on the sorted plurality of images.

According to an embodiment of the disclosure, the obtaining the user input may include receiving a request associated with the generating the time-lapse video from an external electronic device. The obtaining the user input may include the generating the time-lapse video may include transmitting the time-lapse video to the external electronic device.

According to an embodiment of the disclosure, the method may further include identifying an object included in the first image. The method may further include based on the object included in the first image, identifying an obtainment period of the first image.

According to an aspect of the disclosure, a home appliance device for generating a time-lapse video may be provided. The home appliance device may include at least one memory storing at least one instruction; and at least one processor configured to execute the at least one instruction to. The at least one processor may be configured to execute the at least one instruction to identify an image storage mode. The at least one processor may be configured to execute the at least one instruction to obtain a first image. The at least one processor may be configured to execute the at least one instruction to, based on identifying that the image storage mode is an emphasis mode for emphasizing one or more images, obtain a first time difference between the first image and a stored image before the first image, and a first feature value indicating an amount of change between the first image and the stored image before the first image. The at least one processor may be configured to execute the at least one instruction to for each respective image of a first plurality of images of a first image group stored in the at least one memory, identify a second image from among the first plurality of images, based on a second time difference between the respective image and a stored image before the respective image and a second feature value indicating an amount of change between the respective image and the stored image before the respective image. The at least one processor may be configured to execute the at least one instruction to, based on the first time difference, the first feature value, the second time difference, and the second feature value, generate a second image group by removing the second image from the first image group and adding the first image to the first image group. The at least one processor may be configured to execute the at least one instruction to generate the time-lapse video by using a second plurality of images of the second image group.

According to an embodiment of the disclosure, the at least one processor may be further configured to execute the at least one instruction to obtain a total score corresponding to a weighted average of the second time difference and the second feature value of each respective image of the first plurality of images. The at least one processor may be configured to execute the at least one instruction to compare the total scores of the first plurality of images and determine the second image corresponding to a minimum total score.

According to an embodiment of the disclosure, the at least one processor may be further configured to execute the at least one instruction to obtain a first total score of the first image, the first total score corresponding to a first weighted average of the first time difference and the first feature value. The at least one processor may be configured to execute the at least one instruction to obtain a second total score of the second image, the second total score corresponding to a second weighted average of the second time difference and the second feature value. The at least one processor may be configured to execute the at least one instruction to, based on the first total score being greater than or equal to the second total score, generate the second image group by removing the second image from the first image group and adding the first image to the first image group.

According to an embodiment of the disclosure, the at least one processor may be further configured to execute the at least one instruction to: based on the first total score being greater than or equal to a threshold value, add the first image to a second highlight image group. The at least one processor may be configured to execute the at least one instruction to, based on the first total score being less than the threshold value, obtain a second average total score of a second plurality of highlight images included in the second highlight image group. The at least one processor may be configured to execute the at least one instruction to, based on the second average total score being greater than or equal to a first average total score of a first highlight image group, remove a first plurality of highlight images included in the first highlight image group and add the second plurality of highlight images included in the second highlight image group to the first highlight image group.

According to an embodiment of the disclosure, the at least one processor may be further configured to execute the at least one instruction to: sort the second plurality of images of the second image group and the first plurality of highlight images included in the first highlight image group according to a time order. The at least one processor may be configured to execute the at least one instruction to generate the time-lapse video by using the sorted plurality of images.

According to an embodiment of the disclosure, the at least one processor may be further configured to execute the at least one instruction to: obtain a user input indicating a type of a special effect selected by a user. The at least one processor may be configured to execute the at least one instruction to modify the first plurality of highlight images of the first highlight image group by using the type of the special effect.

According to an embodiment of the disclosure, the at least one processor may be further configured to execute the at least one instruction to: based on identifying that the image storage mode is an equality mode for equally storing a scene of an image, identify a number of times of image obtainment. The at least one processor may be configured to execute the at least one instruction to change an obtainment period of the first image, based on the number of times of the image obtainment being a predetermined value.

According to an embodiment of the disclosure, the at least one processor may be further configured to execute the at least one instruction to: obtain a user input associated with a generation of the time-lapse video. The at least one processor may be configured to execute the at least one instruction to in response to the user input associated with the generation of the time-lapse video, sort a plurality of stored images according to a time order. The at least one processor may be configured to execute the at least one instruction to generate the time-lapse video based on the sorted plurality of images.

According to an embodiment of the disclosure, the at least one processor may be further configured to execute the at least one instruction to: receive a request associated with the generation of the time-lapse video from an external electronic device. The at least one processor may be configured to execute the at least one instruction to transmit the time-lapse video to the external electronic device.

According to an embodiment of the disclosure, the at least one processor may be further configured to execute the at least one instruction to: identify an object included in the first image. The at least one processor may be configured to execute the at least one instruction to, based on the object included in the first image, identify an obtainment period of the first image.

The invention claimed is:

1. A method of generating a time-lapse video, the method comprising:
   identifying an image storage mode;
   obtaining a first image;
   based on identifying that the image storage mode is an emphasis mode for emphasizing one or more images, obtaining a first time difference between the first image and a stored image, and a first feature value indicating a first amount of change between the first image and the stored image;
   for each respective image of a first plurality of images of a first image group stored in a memory, identifying a second image from among the first plurality of images, based on a second time difference between the respective image and the second image and a second feature value indicating a second amount of change between the respective image and the stored image;
   based on the first time difference, the first feature value, the second time difference, and the second feature value, generating a second image group by removing the second image from the first image group and adding the first image to the first image group; and
   generating the time-lapse video by using a second plurality of images of the second image group.

2. The method of claim 1, wherein the identifying the second image comprises:
   obtaining a total score corresponding to a weighted average of the second time difference and the second feature value of each respective image of the first plurality of images; and
   comparing the total scores of the first plurality of images and identifying the second image corresponding to a minimum total score.

3. The method of claim 1, wherein the generating the second image group comprises:
   obtaining a first total score of the first image, the first total score corresponding to a first weighted average of the first time difference and the first feature value;
   obtaining a second total score of the second image, the second total score corresponding to a second weighted average of the second time difference and the second feature value; and
   based on the first total score being greater than or equal to the second total score, generating the second image group by removing the second image from the first image group and adding the first image to the first image group.

4. The method of claim 3, further comprising:
   based on the first total score being greater than or equal to a threshold value, adding the first image to a second highlight image group;
   based on the first total score being less than the threshold value, obtaining a second average total score of a second plurality of highlight images included in the second highlight image group; and
   based on the second average total score being greater than or equal to a first average total score of a first highlight image group, removing a first plurality of highlight images included in the first highlight image group and adding the second plurality of highlight images included in the second highlight image group to the first highlight image group.

5. The method of claim 4, wherein the generating the time-lapse video comprises:

sorting the second plurality of images of the second image group and the first plurality of highlight images included in the first highlight image group according to a time order; and
generating the time-lapse video by using the sorted plurality of images.

6. The method of claim 5, further comprising:
obtaining a user input for a type of a special effect selected by a user,
wherein the generating the time-lapse video by using the sorted plurality of images comprises modifying the first plurality of highlight images of the first highlight image group by using the type of the special effect.

7. The method of claim 1, further comprising:
based on identifying that the image storage mode is an equality mode for equally storing a scene of an image, identifying a number of times of image obtainment; and
changing an obtainment period of the first image, based on the number of times of the image obtainment being a predetermined value.

8. The method of claim 1, further comprising:
obtaining a user input associated with generation of the time-lapse video;
based on the user input associated with the generating the time-lapse video, sorting a plurality of stored images according to a time order; and
generating the time-lapse video based on the sorted plurality of images.

9. The method of claim 8, wherein the obtaining the user input comprises receiving a request associated with the generating the time-lapse video from an external electronic device, and
the generating the time-lapse video comprises transmitting the time-lapse video to the external electronic device.

10. The method of claim 1, further comprising:
identifying an object included in the first image; and
based on the object included in the first image, identifying an obtainment period of the first image.

11. A home appliance device for generating a time-lapse video, the home appliance device comprising:
at least one memory storing at least one instruction; and
at least one processor configured to execute the at least one instruction to:
identify an image storage mode;
obtain a first image;
based on identifying that the image storage mode is an emphasis mode for emphasizing one or more images, obtain a first time difference between the first image and a stored image, and a first feature value indicating a first amount of change between the first image and the stored image;
for each respective image of a first plurality of images of a first image group stored in the at least one memory, identify a second image from among the first plurality of images, based on a second time difference between the respective image and the second image and a second feature value indicating a second amount of change between the respective image and the stored image;
based on the first time difference, the first feature value, the second time difference, and the second feature value, generate a second image group by removing the second image from the first image group and adding the first image to the first image group; and
generate the time-lapse video by using a second plurality of images of the second image group.

12. The home appliance device of claim 11, wherein the at least one processor is further configured to execute the at least one instruction to:
obtain a total score corresponding to a weighted average of the second time difference and the second feature value of each respective image of the first plurality of images; and
compare the total scores of the first plurality of images and determine the second image corresponding to a minimum total score.

13. The home appliance device of claim 11, wherein the at least one processor is further configured to execute the at least one instruction to:
obtain a first total score of the first image, the first total score corresponding to a first weighted average of the first time difference and the first feature value;
obtain a second total score of the second image, the second total score corresponding to a second weighted average of the second time difference and the second feature value; and
based on the first total score being greater than or equal to the second total score, generate the second image group by removing the second image from the first image group and adding the first image to the first image group.

14. The home appliance device of claim 13, wherein the at least one processor is further configured to execute the at least one instruction to:
based on the first total score being greater than or equal to a threshold value, add the first image to a second highlight image group;
based on the first total score being less than the threshold value, obtain a second average total score of a second plurality of highlight images included in the second highlight image group; and
based on the second average total score being greater than or equal to a first average total score of a first highlight image group, remove a first plurality of highlight images included in the first highlight image group and add the second plurality of highlight images included in the second highlight image group to the first highlight image group.

15. The home appliance device of claim 14, wherein the at least one processor is further configured to execute the at least one instruction to:
sort the second plurality of images of the second image group and the first plurality of highlight images included in the first highlight image group according to a time order; and
generate the time-lapse video by using the sorted plurality of images.

16. The home appliance device of claim 15, wherein the at least one processor is further configured to execute the at least one instruction to:
obtain a user input for a type of a special effect selected by a user; and
wherein the generating the time-lapse video by using the sorted plurality of images comprises modifying the first plurality of highlight images of the first highlight image group by using the type of the special effect.

17. The home appliance device of claim 11, wherein the at least one processor is further configured to execute the at least one instruction to:
based on identifying that the image storage mode is an equality mode for equally storing a scene of an image, identify a number of times of image obtainment; and change an obtainment period of the first image, based on the number of times of the image obtainment being a predetermined value.

18. The home appliance device of claim 11, wherein the at least one processor is further configured to execute the at least one instruction to:
obtain a user input associated with generation of the time-lapse video;
based on the user input associated with the generating the time-lapse video, sort a plurality of stored images according to a time order; and
generate the time-lapse video based on the sorted plurality of images.

19. The home appliance device of claim 18, wherein the obtaining the user input comprises receiving a request associated with the generating the time-lapse video from an external electronic device, and
the generating the time-lapse video comprises transmitting the time-lapse video to the external electronic device.

20. The home appliance device of claim 11, wherein the at least one processor is further configured to execute the at least one instruction to:
identify an object included in the first image; and
based on the object included in the first image, identify an obtainment period of the first image.

* * * * *